(12) United States Patent
Blomqvist et al.

(10) Patent No.: US 11,846,508 B2
(45) Date of Patent: Dec. 19, 2023

(54) GYROSCOPE WITH MASS PAIRS

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/241,814

(22) Filed: Apr. 27, 2021

(65) Prior Publication Data
US 2021/0372794 A1 Dec. 2, 2021

(30) Foreign Application Priority Data
May 25, 2020 (FI) .................................. 20205523

(51) Int. Cl.
*G01C 19/574* (2012.01)
*G01C 19/5747* (2012.01)
*G01C 19/5712* (2012.01)

(52) U.S. Cl.
CPC ..... *G01C 19/5712* (2013.01); *G01C 19/5747* (2013.01)

(58) Field of Classification Search
CPC .............. G01C 19/5733; G01C 19/574; G01C 19/5747
See application file for complete search history.

(56) References Cited

U.S. PATENT DOCUMENTS

| 2010/0281977 A1 | 11/2010 | Coronato et al. |
| 2012/0279300 A1 | 11/2012 | Walther |
| 2012/0291548 A1* | 11/2012 | Kanemoto ......... G01C 19/5733 73/504.12 |
| 2013/0298672 A1 | 11/2013 | Kuhlmann et al. |

(Continued)

FOREIGN PATENT DOCUMENTS

| EP | 2573516 A1 | 3/2013 |
| WO | WO 2005/103621 A1 | 11/2005 |
| WO | WO 2020/045917 A1 | 3/2020 |

OTHER PUBLICATIONS

European Search Report dated Sep. 17, 2021 corresponding to European Patent Application No. 21170643.

(Continued)

*Primary Examiner* — Stephen D Meier
*Assistant Examiner* — Ruben C Parco, Jr.
(74) *Attorney, Agent, or Firm* — SQUIRE PATTON BOGGS (US) LLP

(57) ABSTRACT

A microelectromechanical gyroscope comprising first, second, third and fourth Coriolis masses, arranged in that order on an x-axis. In the primary oscillation mode, the Coriolis masses are configured to oscillate so that the second and third Coriolis masses move in linear translation along the x-axis away from a center point when the first and fourth Coriolis masses move in linear translation along the x-axis towards the first center point, and vice versa. When the gyroscope undergoes rotation about a y-axis which is perpendicular to the x-axis, the Coriolis masses are configured to oscillate so that the first, second, third and fourth Coriolis masses undergo vertical motion in a z-direction, wherein the first and third Coriolis masses move up when the second and fourth Coriolis masses move down, and vice versa.

10 Claims, 20 Drawing Sheets

(56) References Cited

U.S. PATENT DOCUMENTS

| | | | |
|---|---|---|---|
| 2015/0114112 A1 | 4/2015 | Valzasina et al. | |
| 2015/0128700 A1 | 5/2015 | Neul | |
| 2015/0330783 A1 | 11/2015 | Rocchi et al. | |
| 2016/0370180 A1* | 12/2016 | Naumann | G01C 19/5614 |
| 2019/0101391 A1* | 4/2019 | Nagata | G01C 19/5649 |
| 2019/0310087 A1 | 10/2019 | Gregory et al. | |

OTHER PUBLICATIONS

Finnish Search Report dated Feb. 5, 2021 corresponding to Finnish Patent Application No. 20205523.

* cited by examiner

GYROSCOPE WITH MASS PAIRS

FIELD OF THE DISCLOSURE

This disclosure relates to microelectromechanical gyroscopes, and more particularly to gyroscopes where an oscillating proof mass system is used to measure angular rotation at least about one rotation axis which lies in the device plane.

BACKGROUND OF THE DISCLOSURE

In microelectromechanical (MEMS) gyroscopes proof masses should preferably be easily set to oscillate in a primary oscillation mode (which may also be called the drive oscillation mode) and also easily undergo oscillation in a secondary oscillation mode (which may also be called the sense oscillation mode) induced by the Coriolis force. A general problem in gyroscope is that the oscillation of the proof masses in these two modes should preferably not be perturbed by external disturbances, for example vibrations in surrounding elements. A gyroscope should preferably be unperturbed by both linear and rotational vibrations so that its output signal is determined only by the angular rotation rate which the gyroscope undergoes in the intended operating frequency range. In automotive applications, for example, potential disturbances typically lie in the frequency range 1-50 kHz, while the input frequency range typically lies below 1 kHz.

A simple MEMS gyroscope may be constructed utilizing only one oscillating proof mass, but the output signal of such a gyroscope will typically be very noisy when external vibrations are present at frequencies close to the operating frequency. One-mass gyroscopes would be practical only at operating frequencies above 50 kHz, but in these frequencies the sensitivity of the gyroscope may be very low and other disturbing effects, such as quadrature signals arising from manufacturing imperfections, often become very prominent. Also, the unbalanced drive mode of the single mass drive causes energy leakage from the drive mode due to the reaction forces of the drive oscillation. This will induce all kinds of issues; increase the drive force needed for operation, stability issues, requirements for hard die attachment. etc.

It is known that a proof mass system where two or four proof masses oscillate in anti-phase can be made much more robust against vibrations than a one-mass gyroscope. Signal components arising from vibrations that induce cophasal movement of the two or four proof masses can to some degree be automatically cancelled via differential measurements. Furthermore, if the cophasal resonant frequency can be brought above 50 kHz without affecting the differential resonant frequency, the disturbing vibrations will typically produce no resonance amplification.

Some MEMS gyroscopes are designed for measuring rotation rate about one axis which is perpendicular to the device substrate. Such gyroscopes may be called z-axis gyroscopes. Other MEMS gyroscopes are designed for measuring rotation rate about either of the two perpendicular axes that lie within the substrate plane. Such gyroscopes may be called x-axis gyroscopes and/or y-axis gyroscopes. Multiaxis MEMS gyroscopes are designed for measuring rotation rate about the x-, y-, and/or z-axis with the same set of oscillating proof masses.

Document US2015330783 discloses an x-axis gyroscope with four proof masses in a chessboard configuration. The proof masses oscillate pairwise in anti-phase.

BRIEF DESCRIPTION OF THE DISCLOSURE

An object of the present disclosure is to provide a simple and robust gyroscope structure. The object of the disclosure is achieved by an arrangement which is characterized by what is stated in the independent claims. The preferred embodiments of the disclosure are disclosed in the dependent claims.

The disclosure is based on the idea of utilizing four Coriolis masses aligned on the x-axis for measuring angular rotation about the y-axis and interconnecting them with coupling and suspension structures. An advantage of the disclosed arrangement is that the x-axis measurement can be made robust while consuming little surface area in the y-direction. The same idea can optionally be applied also on the y-axis, which allows the construction of a compact and robust xy gyroscope. Multiaxis gyroscope systems that utilize the same principle can also be constructed, and the gyroscope can be made even more robust with a configuration where two such systems are placed side by side.

BRIEF DESCRIPTION OF THE DRAWINGS

In the following the disclosure will be described in greater detail with reference to the accompanying drawings, in which.

DETAILED DESCRIPTION OF THE DISCLOSURE

Figures 1, 2A:
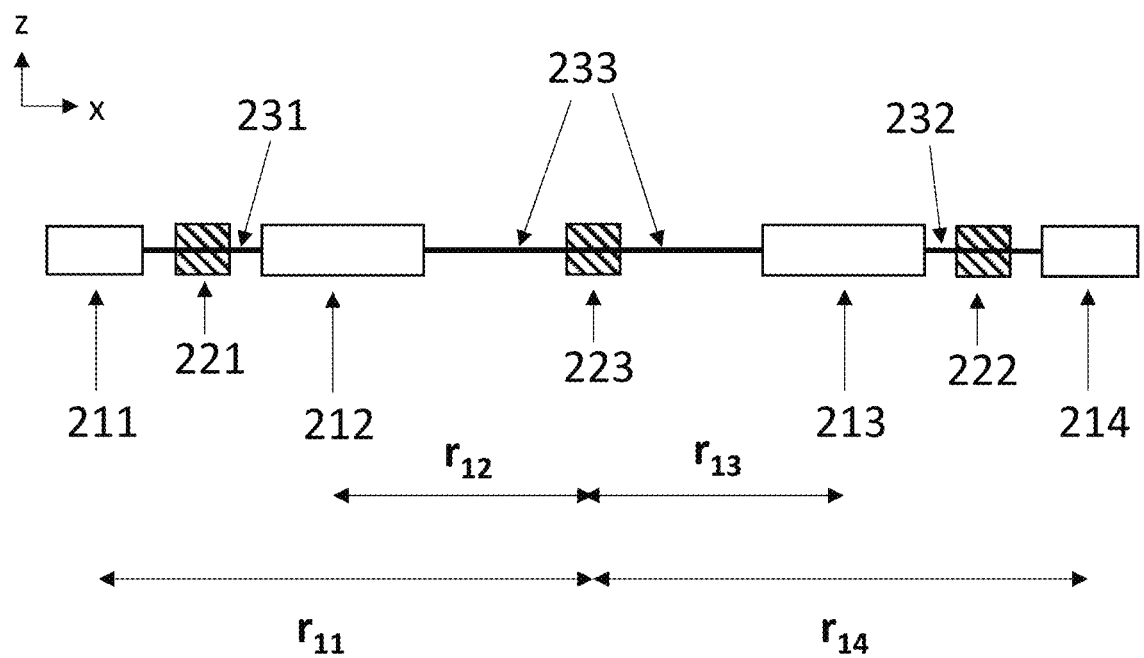
FIG. 1 shows the symbols which are used in this disclosure to illustrate different oscillation modes.
FIGS. 2a-2d illustrate a gyroscope and its oscillation modes.

This disclosure describes a microelectromechanical gyroscope comprising a first set Coriolis masses which in their rest position lie in a horizontal xy-plane defined by a lateral x-axis and a transversal y1-axis. The x-axis crosses the y1-axis orthogonally at a first center point and a vertical z-axis crosses both the x-axis and the y1-axis orthogonally at the first center point.

The first set of Coriolis masses comprises a first and a second Coriolis mass which together form a first Coriolis pair which in its rest position is aligned on the x-axis on a first side of the y1-axis. The second Coriolis mass is closer to the y1-axis than the first. The first set of Coriolis masses also comprises a third and a fourth Coriolis mass which together form a second Coriolis pair which in its rest position is aligned on the x-axis on a second side of the y1-axis. The third Coriolis mass is closer to the y1-axis than the fourth and the second side of the y1-axis is opposite to the first.

The gyroscope also comprises a set of first peripheral anchor points on the first side of the y1-axis and a first peripheral suspension arrangement which suspends the first Coriolis pair from the set of first peripheral anchor points. The gyroscope also comprises a set of second peripheral anchor points on the second side of the y1-axis and a second peripheral suspension arrangement which suspends the second Coriolis pair from the set of second peripheral anchor points. The gyroscope further comprises a first central suspension arrangement which suspends both the first and the second Coriolis pairs from one or more first central anchor points located substantially at the first center point.

The gyroscope further comprises one or more drive transducers which set the first and second Coriolis pairs into motion in a primary oscillation mode, and one or more y-axis sense transducers for detecting the oscillation of the first and second Coriolis pairs in a y-axis secondary oscillation mode induced by the Coriolis force when the gyroscope undergoes angular rotation about a y-axis which is parallel to the y1-axis. The first central suspension arrangement and the first and second peripheral suspension arrangements flexibly accommodate the primary oscillation mode and the y-axis secondary oscillation mode.

In the primary oscillation mode, the first set of Coriolis masses is configured to oscillate so that the second and third Coriolis masses move in linear translation along the x-axis away from the first center point when the first and fourth Coriolis masses move in linear translation along the x-axis towards the first center point, and vice versa. In the y-axis secondary oscillation mode, the first set of Coriolis masses is configured to oscillate so that the first, second, third and fourth Coriolis masses undergo vertical motion wherein the first and third Coriolis masses move up when the second and fourth Coriolis masses move down, and vice versa.

In this disclosure the device plane is illustrated and referred to as the xy-plane. It may also be called the horizontal plane. The z-axis is perpendicular to the xy-plane. It may also be called the vertical axis. Linear and/or rotational motion where the proof mass remains level in the device plane when it moves away from its rest position may be referred to as "in-plane" motion or "motion in the device plane", while linear and/or rotational motion where the proof mass moves away from its rest position in a vertical direction may be referred to as "out-of-plane" motion, or "motion out of the device plane".

In this disclosure, the words "horizontal" and "vertical" merely refer to the device plane and a direction perpendicular to the device plane, respectively. The device plane is typically defined by the substrate in which the micromechanical structures are prepared. The words "horizontal" and "vertical" do not imply anything about how the device should be oriented during manufacture or usage. The words "above" and "below" refer to differences in the vertical z-coordinate when they describe the figures, and the words "up" and "down" refer to two opposite vertical directions.

Rotation about any axis perpendicular to the device plane will be referred to as rotation about the z-axis. Similarly, rotation about any axis parallel to the illustrated x-axis will be referred to as rotation about the x-axis, and rotation about any axis parallel to the illustrated y-axis will be referred to as rotation about the y-axis. The secondary oscillation modes which are induced by the Coriolis force in these three types of rotation will be referred to as z-axis secondary oscillation modes, x-axis secondary oscillation modes and y-axis secondary oscillation modes, respectively.

In this disclosure, the term "spring" refers to a device part which is flexible in at least one direction. The term "suspender" refers to a spring which is placed (possibly together with other device parts) between a fixed part (such as an anchor point) and a device part which oscillates when the device is operated. The terms "suspension structure" and "suspension arrangement" refer to a more complex combination of parts which together provide structural support to the mobile masses. Suspension structures and arrangements include at least one flexible suspender which provides the flexibility needed for accommodating the desired oscillation modes. They may include many suspenders and they may also include rigid parts. The suspenders typically bend or twist when the suspended mobile masses are in motion.

The rigid parts of a suspension structure/arrangement often move when the mobile masses are in motion (assuming that one or more flexible suspenders lie between said rigid parts and the corresponding anchor point). Some springs may form a synchronization structure, or they may be combined with rigid parts to form a synchronization structure. A synchronization structure may function also as a suspension structure. Alternatively, a synchronization structure may provide synchronization without providing structural support. More generally, springs which connect mass elements to each other and transmit oscillation from one mass element to another may also be called coupling springs or connecting springs. While transmitting movement is typically the primary function of coupling/connecting springs, they are also often designed to perform a synchronization function. The structures where such springs are included may be called coupling structures or connecting structures.

Throughout this disclosure, the term "synchronize", and phrases such as "structure A synchronizes oscillation mode X", have the following meaning. Structure A constitutes a mechanical connection in a system of interconnected mass elements which should preferably oscillate in the desired mode X, but preferably not in an undesired mode Y. Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative structure B which only gives structural support.

In general, all suspension, synchronization and coupling arrangements are optimized for support and for flexibility in certain directions and rigidity in other directions. These three variables may conflict with each other, so optimization means finding a good compromise solution. All elements of the gyroscope may influence these compromises.

In this disclosure, "radial" oscillation refers to linear movement in the xy-plane, away from a central point and towards a central point. "Tangential" oscillation refers to movement in the xy-plane, the xz-plane (lateral-vertical), or the yz-plane (transversal-vertical), along the tangent of an imaginary circle centred at a central point. Tangential oscillation in the xy-plane may be called in-plane tangential oscillation, while tangential oscillation in the xz- and yz-planes may be called out-of-plane tangential oscillation. Tangential oscillation may in practice be a mixture of linear movement and rotation. The suspension arrangement will typically determine how a Coriolis mass moves tangentially.

In all embodiments of this disclosure, parts of the device which are referred to as "transversal" parts have a longer dimension in the transversal direction and a shorter dimension in the lateral direction. "Lateral" parts have a longer lateral dimension and a shorter transversal dimension. Parts that are "aligned on the lateral/transversal axis", are placed so that the said axes substantially cross the midpoint of said part. The parts may be symmetric in relation to said axes and/or the axis may cross the center of gravity of said parts.

In the figures of this disclosure, the placement of the Coriolis masses corresponds to their rest positions unless otherwise stated. The oscillation directions of the proof masses in the different embodiments of this disclosure, and the phase relationships between the oscillations, will be illustrated using the symbols presented in FIG. 1. The white arrow shown on row 11 illustrates the primary oscillation mode which occurs in the device plane. The black arrow on row 12 illustrates the secondary mode which may occur (in the device plane) when the gyroscope undergoes rotation about the z-axis. The pair of symbols illustrated on row 13 will be used together to illustrate the out-of-plane movement of a pair proof masses when the gyroscope undergoes rotation about the x-axis. The pair of symbols illustrated on row 14 will be used together to illustrate the out-of-plane movement of a pair proof masses when the gyroscope undergoes rotation about the y-axis. On both rows 13 and 14, the cross illustrates motion away from the viewer and the dot illustrates movement towards the viewer.

In any embodiment presented in this disclosure, capacitive drive transducers may for example be implemented in an opening formed within one or more Coriolis masses. Capacitive sense transducers may be implemented either within an opening in one or more Coriolis masses or adjacent to one or more Coriolis masses to detect the z-axis secondary oscillation mode. Capacitive x-axis and y-axis sense transducers may be implemented above and/or below one or more Coriolis masses to detect the x-axis and/or y-axis secondary oscillation modes, respectively.

Y-Axis Embodiment

FIG. 2a illustrates schematically a gyroscope in the xz-plane. The gyroscope comprises a first set of Coriolis masses which includes first and second Coriolis masses 211 and 212, and third and fourth Coriolis masses 213 and 214. The first center point is located at the first central anchor point 223. The first side of the y1-axis is thereby shown on the left side of the first central anchor point 223, and the second side of the y1-axis is shown on the right side of the first central anchor point 223 in FIG. 2. The gyroscope is configured to measure angular rotation about the y-axis. In other words, the y-axis may in this case be called the input axis or measurement axis of the gyroscope.

The set of first peripheral anchor points is here illustrated simply as one anchor point 221, but it may in practice include several anchor points. The first peripheral suspension arrangement 231 is here illustrated merely as a connecting bar between the first and second Coriolis masses 211 and 212. The same considerations apply to the set of second peripheral anchor points (illustrated as 222) and the second peripheral suspension arrangement 232. One first central anchor point 223 is illustrated, but the one or more first central anchor points could alternatively include multiple first central anchor points, which may for example be located close to the first center point in a symmetric configuration.

Figure 2B:
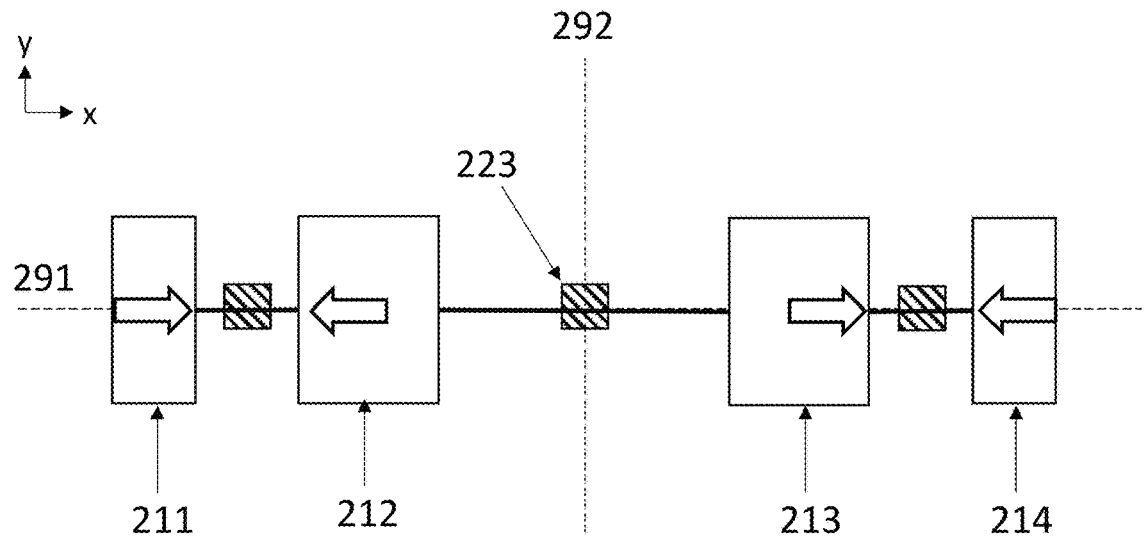

FIG. 2b illustrates the same device schematically in the xy-plane. The Coriolis masses are aligned on the lateral x-axis 291, and the input axis of the gyroscope is in this case the y-axis. The transversal axis 292 is the y1-axis. FIG. 2b also illustrates the primary oscillation mode of the gyroscope. The first and second Coriolis masses 211 and 212 oscillate in anti-phase along the x-axis on the first side of the y1-axis and the third and fourth Coriolis masses 213 and 214 oscillate in anti-phase along the x-axis on the second side of the y1-axis. Furthermore, the primary oscillation is synchronized by the one or more drive transducers and/or by the first central suspension arrangement so that the first and second Coriolis masses move toward each other when the third and fourth Coriolis masses move toward each other. Correspondingly, the first and second Coriolis masses move away from each other when the third and fourth Coriolis masses move away from each other. In other words, the second and third Coriolis masses move in linear translation along the x-axis away from the first center point when the first and fourth Coriolis masses move in linear translation along the x-axis towards the first center point, and vice versa.

Figure 2C:
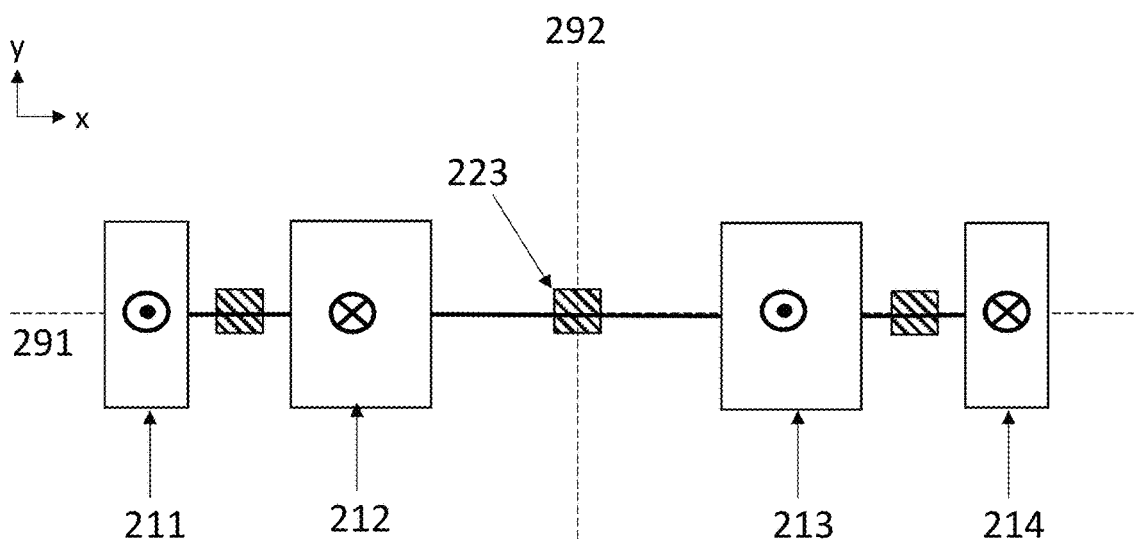
Figure 2D:
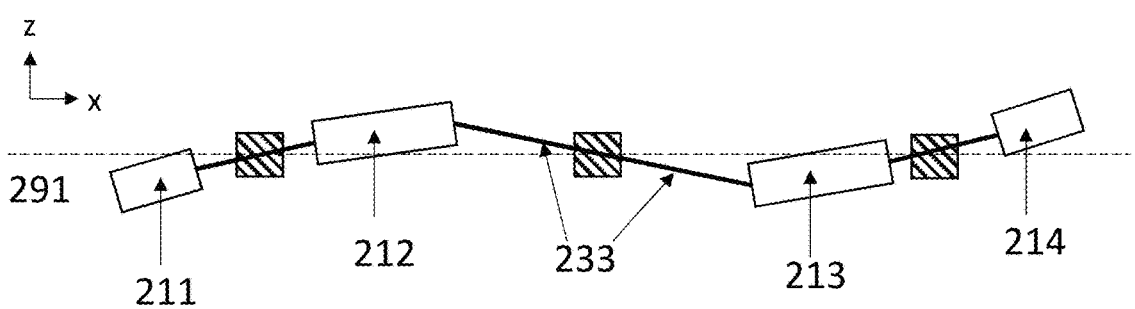

FIGS. 2c and 2d illustrate the y-axis secondary oscillation mode in the xy- and xz-planes, respectively. The Coriolis masses have moved away from their rest positions in FIG. 2d. When the gyroscope undergoes rotation about the y-axis, the Coriolis force acts in the vertical direction and displaces the two Coriolis masses in each pair in opposite directions. Due to the synchronization of the primary oscillation mode, the first and third Coriolis masses 211 and 213 always move in one out-of-plane direction when the second and fourth Coriolis masses 212 and 214 move in the opposite out-of-plane direction. In other words, the first, second, third and fourth Coriolis masses undergo simultaneous vertical motion wherein the first and third Coriolis masses move up when the second and fourth Coriolis masses move down, and vice versa.

The first and second peripheral suspension arrangements and the first central suspension arrangement facilitate oscillation in the primary and secondary oscillation modes illustrated in FIGS. 2b-2d. In general, the term "suspension" refers in this disclosure to an arrangement of one or more flexible springs, which may also be called suspenders, and which extend from a fixed support to a partly mobile element such as a Coriolis mass. As already indicated, the place where the suspender is attached to the fixed support may be called an anchor point. The term "fixed support" means that the support will not be put in motion by the oscillatory movement of the Coriolis masses, but it will move when the sensor undergoes rotation as a whole. The flexibility of the suspenders renders the Coriolis masses partly mobile in relation to the fixed support so that they can be set into the primary oscillation mode by drive transducers at or close to the resonant frequency. The resonance frequency is determined by the inertia of the Coriolis mass and the compliance of the suspension.

Suspension arrangements should flexibly accommodate, and optionally also synchronize, the desired primary and secondary oscillation modes. Suspension arrangements should also preferably resist undesired oscillation modes, for example undesired cophasal oscillations of a Coriolis pair which is being driven into the primary oscillation mode (which should occur in anti-phase, as described above). In this context, cophasal oscillation means simultaneous translational oscillation of two masses, so that they always move in the same direction along an axis. Not all cophasal oscillations are necessarily undesired, but for every desired anti-phase oscillation mode discussed in this disclosure, there exists a corresponding cophasal oscillation mode which would disturb the measurement if its amplitude and frequency come too close to those of the desired anti-phase oscillation mode. The suspension arrangements should therefore preferably suppress those cophasal oscillation modes by shifting the resonant frequencies of cophasal modes as high as possible.

In any embodiment of this disclosure, the central suspension arrangements such as 233 may rotate as a stiff body about the y1-axis (as FIG. 2d) illustrates and about the x-axis. As explained in the practical examples below, a stiffly rotating central suspension arrangement may for example be implemented with a gimbal structure attached to the corresponding central anchor point and a body which extends from the gimbal to the Coriolis masses. The body should be stiff in the out-of-plane direction but it may exhibit flexibility in the in-plane direction.

The vertical motion of the Coriolis masses 211-214 may be linear translation in the vertical direction. Alternatively, each Coriolis pair (211+212 and 213+214) may rotate about an axis which passes through the corresponding set of peripheral anchor points. If the out-of-plane movement is pure rotation, the Coriolis pair remains radially aligned even as it undergoes out-of-plane motion. The structure of the peripheral suspension arrangement will to some extent determine how the Coriolis masses move in secondary oscillation. In most cases the out-of-plane movement of the Coriolis masses will be a combination of linear translation and angular rotation. The Coriolis pair will then typically not remain perfectly aligned with each other when they move out of the xy-plane, as FIG. 2d illustrates.

The gyroscope may be balanced by making the moments of inertia of the first, second, third and fourth Coriolis masses with respect to the y1-axis 292 all substantially equal. In other words, referring back to FIG. 2a where the distances of the centers of gravity of the Coriolis masses from the y1-axis 292 are indicated by $r_{11}, r_{12}, r_{13}$ and $r_{14}$, and indicating the weights of the first, second, third and fourth Coriolis masses by $m_{11}, m_{12}, m_{13}$ and $m_{14}$, respectively, the Coriolis masses may be placed so that:

$$m_{11}r_{11}^2 = m_{12}r_{12}^2 = m_{13}r_{13}^2 = m_{14}r_{14}^2$$

This may for example be achieved by selecting $m_{11}=m_{14}$, $r_{11}=r_{14}$, $m_{12}=m_{13}$, $r_{12}=r_{13}$ and dimensioning the other relationships according to the above formula. It may in some cases be preferable to have equal moments of inertia without having perfect symmetry in relation to the y1-axis 292. The central and peripheral suspension arrangements will also influence the balancing of the secondary oscillation illustrated in FIG. 2d.

More generally, the gyroscope may be balanced by making the sum of the moments of inertia of the second (212) and third (213) Coriolis masses with respect to the y1-axis substantially equal to the sum of the moments of inertia of the first (211) and fourth (214) Coriolis masses with respect to the y1-axis. In other words, the moment of inertia of the second Coriolis mass 212 with respect to the y1-axis plus the moment of inertia of the third Coriolis mass 213 with respect to the y1-axis may be substantially equal to the moment of inertia of the first Coriolis mass 211 with respect to the y1-axis plus the moment of inertia of the fourth Coriolis mass 214 with respect to the y1-axis:

$$m_{11}r_{11}^2 + m_{14}r_{14}^2 = m_{12}r_{12}^2 + m_{13}r_{13}^2$$

As illustrated in FIG. 2d, the Coriolis masses 211-214 and suspension arrangements form an oscillating system similar to three interconnected seesaws in the secondary oscillation mode. The anti-phase drive oscillation of each Coriolis pair and the coupling provided by the central and peripheral suspension arrangements makes the gyroscope robust against external disturbances.

Figure 3A:
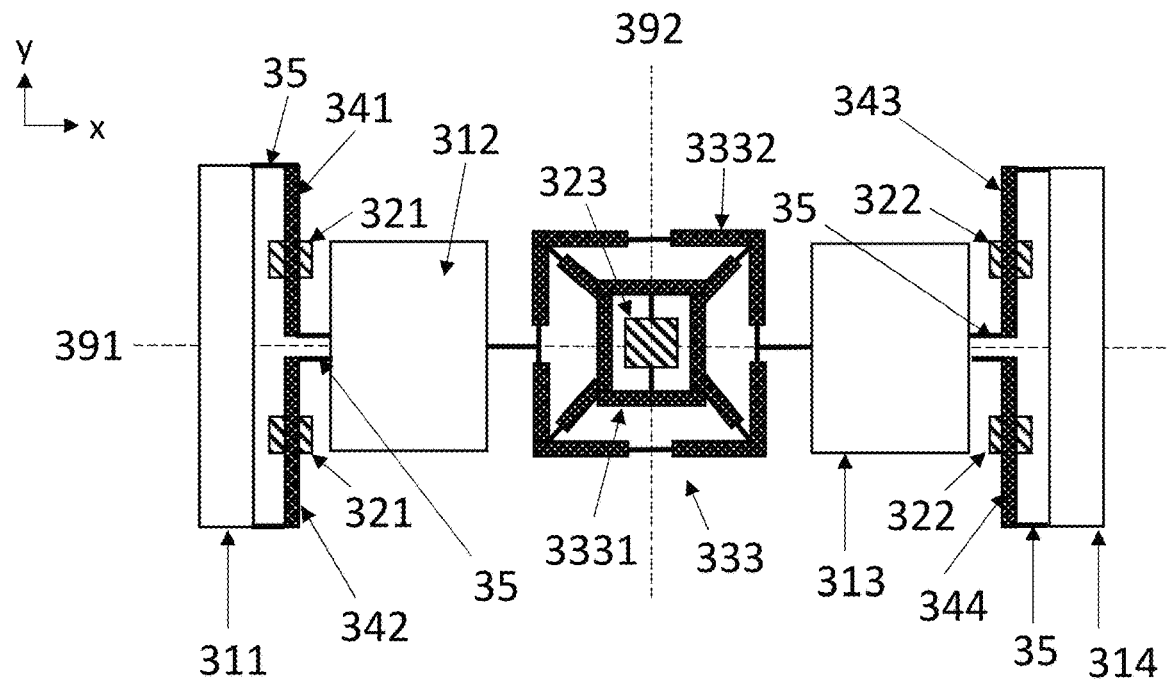
FIGS. 3a-3c illustrate peripheral suspension arrangements.

FIG. 3a illustrates schematically one example of a peripheral suspension arrangement which can accommodate the primary oscillation mode and the y-axis secondary oscillation mode. Reference numbers 311-314, 323, 333 and 391-392 correspond to reference numbers 211-214, 223, 233 and 291-292, respectively, in FIGS. 2a-2d. The set of first peripheral anchor points here consists of two first peripheral anchor points 321 placed on opposite sides of the x-axis at a substantially equal distance from the x-axis. The first peripheral suspension arrangement comprises two first transversal seesaws 341 and 342. The proximal end of each first transversal seesaw, which is the end closer to the x-axis, is connected to the second Coriolis mass 312. The distal end of each first transversal seesaw, which is further away from the x-axis than its proximal end, is connected to the first Coriolis mass 311.

Figure 3B:
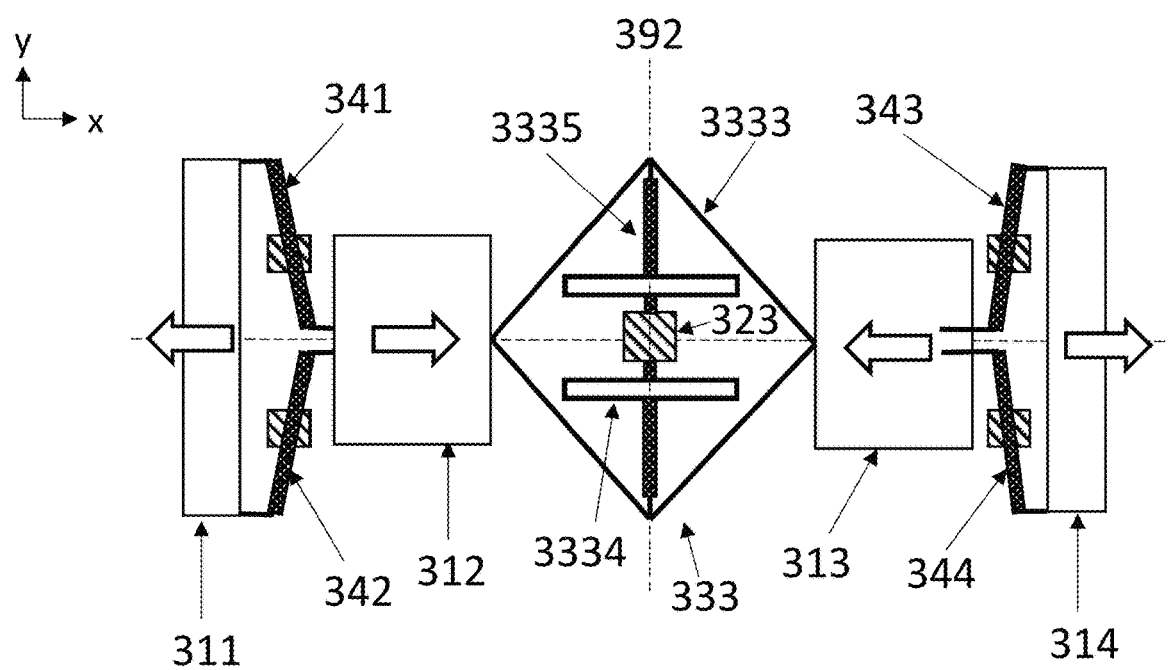
Figure 3C:
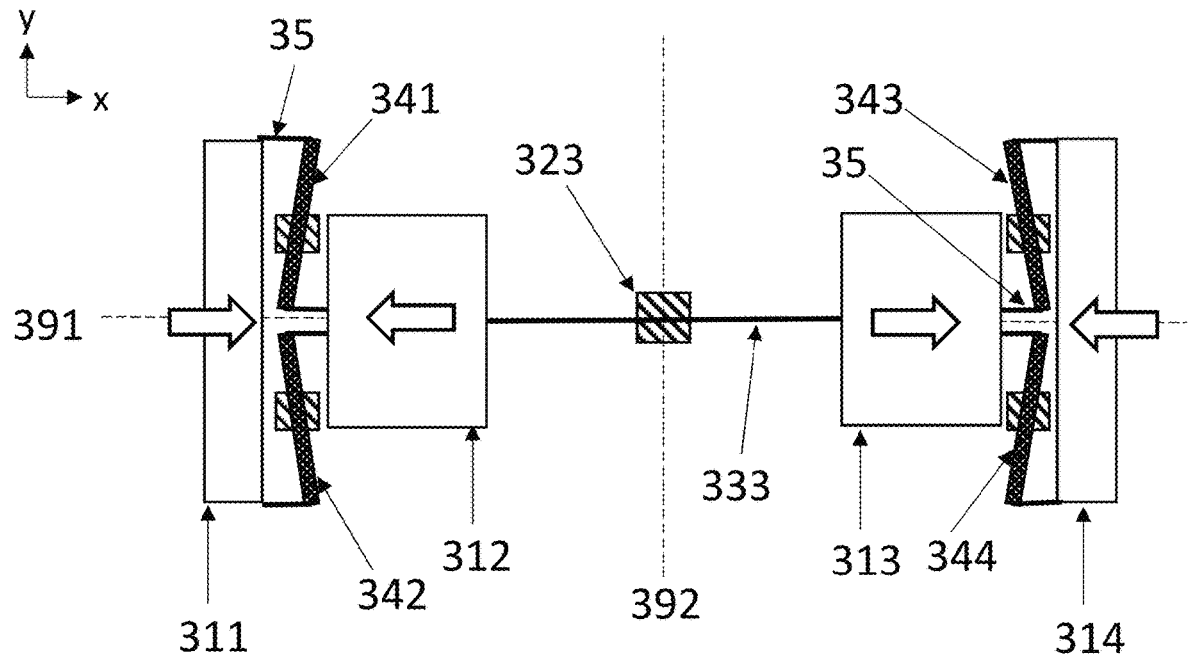

Correspondingly, the set of second peripheral anchor points here consists of two second peripheral anchor points 322 placed on opposite sides of the x-axis at a substantially equal distance from the x-axis. The second peripheral suspension arrangement comprises two second transversal seesaws 343 and 344. The proximal end of each second transversal seesaw, which is the end closer to the x-axis, is connected to the third Coriolis mass 313, and the distal end of each second transversal seesaw, which is further away from the x-axis than its proximal end, is connected to the fourth Coriolis mass 314. Each end of a transversal seesaw may be connected to the corresponding Coriolis mass with a connection spring 35. These connections springs may have some degree of torsional flexibility and in-plane bending flexibility. FIGS. 3b and 3c illustrate how these first and second peripheral suspension arrangements flexibly accommodate the primary oscillation mode when each Coriolis pair moves a maximum and a minimum distance from each other, respectively. The Coriolis masses have moved away from their rest positions in FIGS. 3b and 3c. The movements are greatly exaggerated in relation to the sizes of the illustrated elements. The transversal seesaws 341-344 are connected to their corresponding peripheral anchor points 321/322 with anchoring springs (not illustrated) that have enough in-plane flexibility to allow these seesaws to turn in the xy-plane as illustrated. The first pair of transversal seesaws 341+342 may be transversally aligned in their rest position, as FIG. 3a illustrates. The second pair of transversal seesaws 343+344 may also be transversally aligned in their rest position.

The anchoring springs have sufficient torsional flexibility to allow the transversal seesaws 341-344 to rotate about a lateral rotation axis in the y-axis secondary oscillation mode. These lateral rotation axes may pass through the peripheral anchor point to which the corresponding seesaw is attached. The first peripheral suspension thereby accommodates the out-of-plane oscillation of the first and second Coriolis masses 311 and 312 in the y-axis secondary oscillation mode.

It is alternatively possible to couple the seesaws to the Coriolis masses so that in the first peripheral suspension arrangement the proximal end of each first transversal seesaw is connected to the first Coriolis mass 311 and the distal end of each first transversal seesaw is connected to the second Coriolis mass 312. Correspondingly, in the second peripheral suspension arrangement the proximal end of each second transversal seesaw may be connected to the fourth Coriolis mass 314 and the distal end of each second transversal seesaw may be connected to the third Coriolis mass 313.

The first central suspension arrangement 333 may comprise any spring system which can flexibly accommodate simultaneous movement of the second and third Coriolis masses 312 and 313 away from and towards the first center point in the primary oscillation mode, and rotation of the first central suspension arrangement about the transversal axis 392 when the masses oscillate in the y-axis secondary oscillation mode, as FIG. 2d illustrates.

FIG. 3a illustrates one example of a central suspension arrangement 333 where the secondary oscillation is accommodated by two torsion bars which extend in opposite directions from the central anchor point 323 along the axis 392 to a rigid support 3331. The primary oscillation is accommodated by four L-shaped corner elements 3332 which together surround the rigid support 3331 and are joined to each other with springs which allow the corner elements to turn in relation to each other in the device plane.

FIG. 3b illustrates an alternative central suspension arrangement 333 where a bendable frame 3333 with in-plane flexibility surrounds the central anchor point 323. Linearly flexible box-springs 334 are attached to support bars 3335 and accommodate the bending of the bendable frame 3333 as the masses move in primary oscillation. The secondary oscillation is accommodated by torsion bars which connect the support bars 3335 to the frame 3333.

Figure 4A:
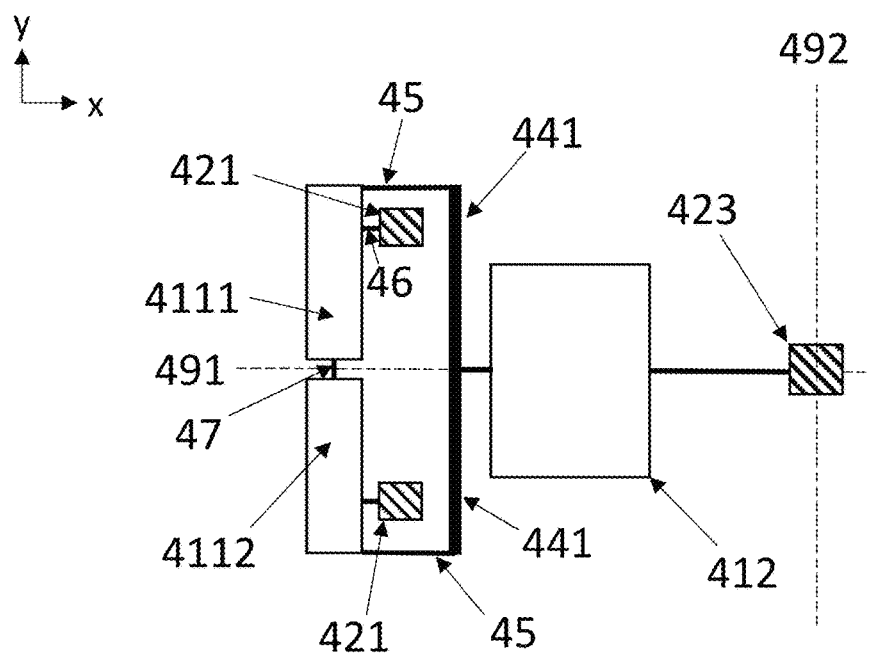
FIGS. 4a-4c also illustrate peripheral suspension arrangements.

FIG. 4a illustrates an alternative peripheral suspension arrangement. Reference numbers 411-412, 423 and 491-492 correspond to reference numbers 211-212, 223 and 291-292, respectively, in FIGS. 2a-2d.

In FIG. 4a, the set of first peripheral anchor points comprises two first peripheral anchor points 421 placed on opposite sides of the x-axis at a substantially equal distance from the x-axis. The first peripheral suspension arrangement comprises a first transversal, vertically stiff inner bar 441 connected to the second Coriolis mass 412. The first Coriolis mass comprises a first part 4111 and a second part 4112. A first end of the first inner bar 441 is connected to a first end of the first part 4111 of the first Coriolis mass. A second end of the first inner bar 441 is connected to a first end of the second part 4112 of the first Coriolis mass. The second end of said first part 4111 is connected to the second end of said second part 4112 with a laterally flexible connection spring 47. Said first and second parts 4111 and 4112 are suspended from respective first peripheral anchor points 421 with laterally oriented, torsionally flexible suspension springs 46.

The same arrangement can be implemented at the opposite end of the gyroscope so that the set of second peripheral anchor points comprises two second peripheral anchor points placed on opposite sides of the x-axis at a substantially equal distance from the x-axis. The second peripheral suspension arrangement then comprises a second transversal, vertically stiff inner bar connected to the second Coriolis mass. The fourth Coriolis mass comprises a first part and a second part. A first end of the second inner bar is connected to a first end of the first mass part of the fourth Coriolis mass. A second end of the second inner bar is connected to a first end of the second mass part of the fourth Coriolis mass. The second end of the first mass part of the fourth Coriolis mass is connected to the second end of the second mass part of the fourth Coriolis mass with a laterally flexible connection spring. The first and second mass parts of the fourth Coriolis mass are suspended from respective second peripheral anchor points with laterally oriented, torsionally flexible suspension springs. This arrangement corresponds to the one illustrated in FIG. 4a, mutatis mutandis, so it is not separately illustrated.

Connecting springs 45 join the first inner bar 441 to the two parts of the first Coriolis mass 4111 and 4112, as FIG. 4a illustrates. The inner bar 441 may be aligned on the x-axis 491. The first and second parts 4111 and 4112 may be transversally aligned, as FIG. 4a illustrates.

Figure 4B:
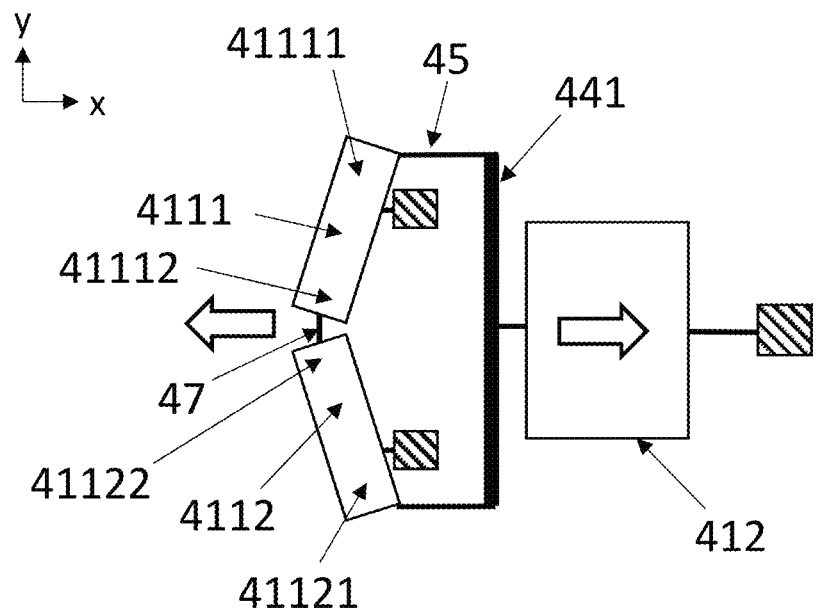
Figure 4C:
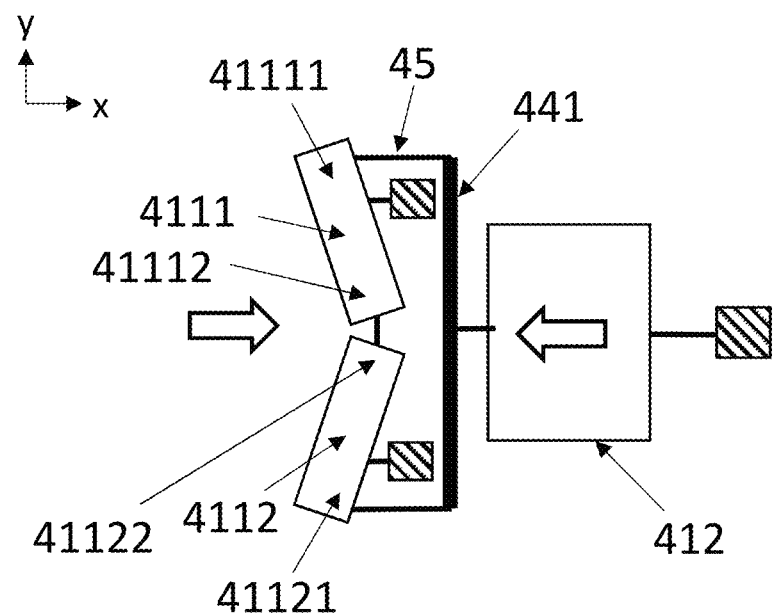

FIG. 4b illustrates how the first peripheral suspension arrangement flexibly accommodates the primary oscillation mode when the Coriolis pair moves a maximum distance from each other (and away from their rest positions). The inner bar 441 pulls first ends 41111 and 41121 to the right, which shifts the second ends 41112 and 41122 to the left. The movements are greatly exaggerated in relation to the sizes of the illustrated elements. The connection spring 47 has enough in-plane and out-of-plane flexibility to allow the two parts of the first Coriolis mass 4111 and 4112 to turn in relation to each other. The location of the mass elements in the opposite half of the primary oscillation cycle is illustrated in FIG. 4c, where the mass elements are again showed away from their rest positions. The inner bar 441 now pushes the first ends 41111 and 41121 to the left, which shifts the second ends 41112 and 41122 to the right. In other words, the first and second parts 4111 and 4112 of the first Coriolis mass rotate in the device plane in anti-phase oscillation in the primary oscillation mode, as FIGS. 4b and 4c illustrate.

The first peripheral anchor points 421 may be placed closer to the first ends 41111 and 41121 than to the second ends 41112 and 41122 of the two parts of the first Coriolis mass, as FIGS. 4a-4c illustrate. The two ends of the inner bar 441 are then also connected to the first ends as these figures show. Another alternative (which is not illustrated) is that the first peripheral anchor points 421 may be placed closer to the second ends 41112 and 41122 than to the first ends 41111 and 41121 of the two parts of the first Coriolis mass. In that case, the inner bar (or a corresponding coupling structure) may be connected to the second ends 41112 and 41122. In other words, the center of gravity of the first and second parts 4111 and 4112 should move in relation to the first peripheral anchor points in primary oscillation. This can be achieved by placing the first peripheral anchor points 421 closer to either the first ends than to the second ends or vice versa, as long as the inner bar (or a corresponding coupling structure) is attached to the ends which are closer to the anchor points 421.

In the y-axis secondary oscillation mode (not illustrated), the first and second parts 4111 and 4112 of the first Coriolis mass both tilt in seesaw motion in relation to their respective anchor points. The inner bar transmits the vertical movement of the second Coriolis mass 412 to the first ends first ends 41111 and 41121, which thereby move in the same vertical direction as the second Coriolis mass 412. The respective second ends 41112 and 41122 move in the opposite vertical direction. In the y-axis secondary oscillation mode, the first and second parts thereby rotate out of the device plane in anti-phase, so that their first ends 41111 and 41121 move up and when second ends 41112 and 41122 move down, and vice versa.

To simplify the presentation, the first and second Coriolis masses have been presented as clearly distinct elements in FIGS. 4a-4c. However, it can be understood from the description above that the inner bar 441 and the first ends of the seesaws 41111 and 41112 move in the same horizontal and vertical directions as the second Coriolis mass 412 in the primary oscillation mode and the y-axis secondary oscillation mode, respectively. These parts of the oscillating system may thereby effectively form a part of the second Coriolis mass. The second ends 41112 and 41122 of the seesaws, which move in the opposite horizontal and vertical directions, then form the effective first Coriolis mass.

As explained above, the placement of the anchor points 421 (and the properties of the suspension springs 46 and connecting spring 47) influence the turning of the seesaws and thereby influence also the dividing line between the parts of the seesaw which contribute to the first Coriolis mass and the parts which contribute to the second Coriolis mass. The influence of the seesaws should thereby be taken into account when the moments of inertia of the first Coriolis mass and the second Coriolis mass are calculated. These considerations also apply to FIG. 3a, where the opposite ends of the transversal seesaws 341-342 and 343-344 effectively form parts of the first and second Coriolis mass and third and fourth Coriolis mass, respectively.

In the y-axis secondary oscillation mode where the first and second parts 4111 and 4112 tilt in seesaw motion out of the device plane, the moving center of gravity of 4111 and 4112 combined should preferably be equal and opposite to the torque produced by the moving mass of the Coriolis mass 412 with respect to the transversal axis 492. This way external angular accelerations will be cancelled for y-axis secondary sense.

In FIGS. 4a-4c, the inner bar 441 may also be replaced with any corresponding coupling structure which can transmit the movement of the second Coriolis mass to the appropriate ends of the first and second parts of the first Coriolis mass, as explained above.

The peripheral suspension arrangements illustrated in FIGS. 3a and 4a can also be implemented in the embodiments illustrated where third and fourth Coriolis pairs are aligned on the y1-axis and suspended from third and fourth peripheral suspension arrangements, respectively.

XY-Axis Embodiment

Figure 5A:
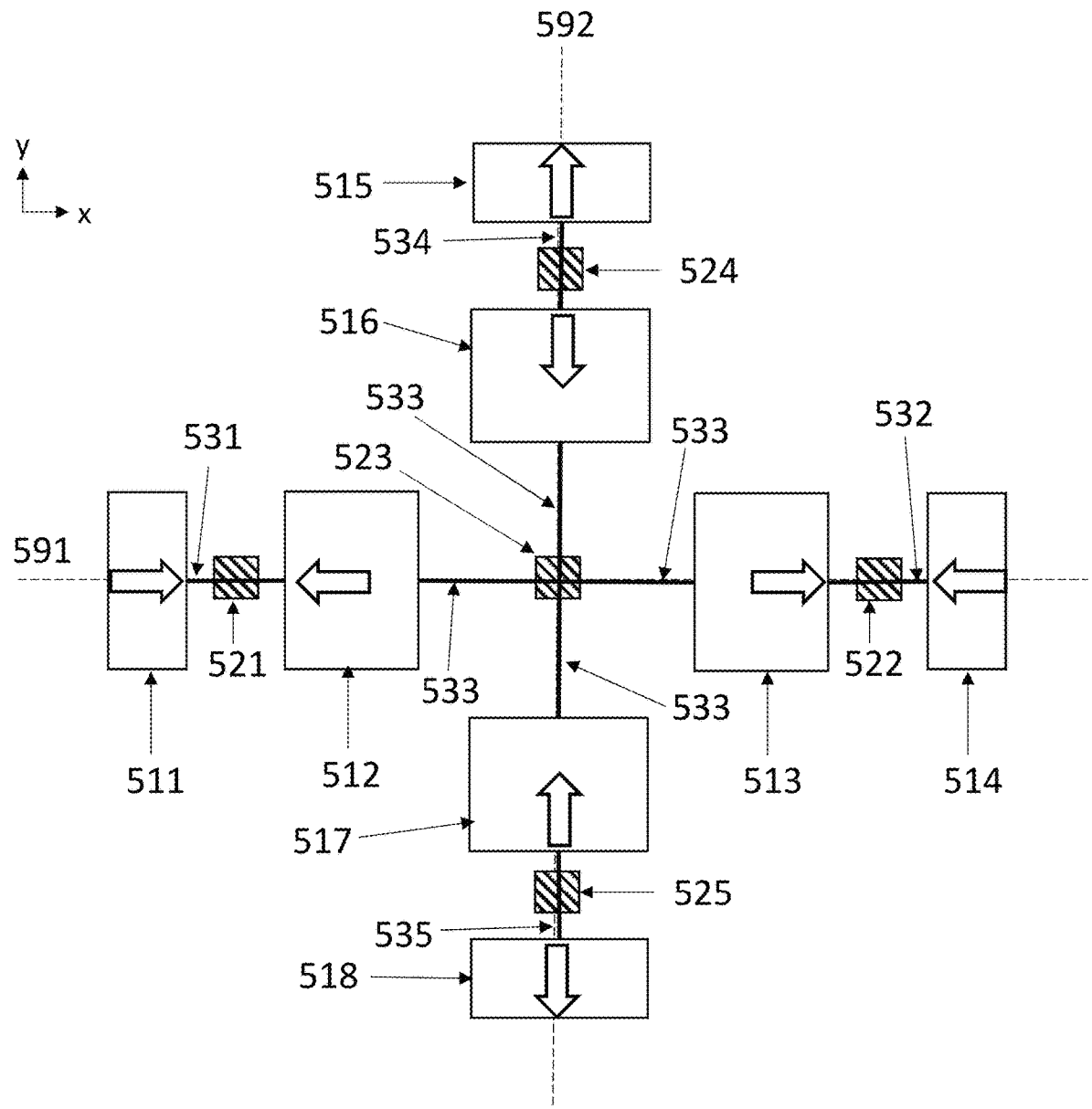
FIGS. 5a-5d illustrate a gyroscope and its oscillation modes.

The measurement principle presented for the y-axis measurement above can be extended to a simultaneous measurement on the x-axis. In this case the gyroscope has two input axes, the y-axis and the x-axis. FIG. 5a illustrates schematically a gyroscope configured for measuring angular rotation rate about both the lateral x-axis and the transversal y-axis. Reference numbers 511-514, 521-523, 531-533 and 591-592 correspond to reference numbers 211-214, 221-223, 231-233 and 291-292, respectively, in FIGS. 2a-2d.

In addition to the elements already discussed above, in FIG. 5 the gyroscope further comprises a second set of Coriolis masses, and the second set of Coriolis masses comprises a fifth and a sixth Coriolis mass (515, 516) which together form a third Coriolis pair which in its rest position is aligned on the y1-axis on a first side of the x-axis. The sixth Coriolis mass 516 is closer to the x-axis than the fifth 515.

The second set of Coriolis masses further comprises a seventh and an eighth Coriolis mass (517, 518) which together form a fourth Coriolis pair which in its rest position is aligned on the y1-axis on a second side of the x-axis. The seventh Coriolis mass 517 is closer to the x-axis than the eighth 518, and the second side of the x-axis is opposite to the first.

The gyroscope also comprises a set of third peripheral anchor points 524 on the first side of the x-axis and a third peripheral suspension arrangement 534 which suspends the third Coriolis pair from the set of third peripheral anchor points 524. The gyroscope also comprises a set of fourth peripheral anchor points 525 on the second side of the x-axis and a fourth peripheral suspension arrangement 535 which suspends the fourth Coriolis pair from the set of fourth peripheral anchor points 525. The first central suspension arrangement 533 suspends both the third and the fourth Coriolis pairs from the first central anchor point 523.

The one or more drive transducers (not illustrated) also set the third and fourth Coriolis pairs into motion in the primary oscillation mode. The gyroscope comprises one or more x-axis sense transducers (not illustrated) for detecting the oscillation of the third and fourth Coriolis pairs in an x-axis secondary oscillation mode induced by the Coriolis force when the gyroscope undergoes angular rotation about the x-axis. The first central suspension arrangement 533 and the third and fourth peripheral suspension arrangements (534, 535) flexibly accommodate the primary oscillation mode and the x-axis secondary oscillation mode.

In the primary oscillation mode, the second set of Coriolis masses is configured to oscillate so that the sixth and seventh Coriolis masses (516, 517) move in linear translation along the y1-axis away from the first center point when the fifth and eighth Coriolis masses (515, 518) move in linear translation along the y1-axis towards the first center point, and vice versa.

In the primary oscillation mode, the fifth Coriolis mass either moves away from the first center point when the first Coriolis mass moves towards the first center point, and vice versa (the fifth Coriolis mass moves towards the first center point when the first Coriolis mass moves away from the first center point), or the fifth Coriolis mass and the first Coriolis mass move away from and towards the first center point at the same time, In the x-axis secondary oscillation mode the second set of Coriolis masses is configured to oscillate so that the fifth, sixth, seventh and eighth Coriolis masses (515-518) undergo simultaneous vertical translation wherein the fifth and seventh Coriolis masses (515, 517) move up when the sixth and eighth Coriolis masses (516, 518) move down, and vice versa.

The moment of inertia of the sixth Coriolis mass with respect to the x-axis plus the moment of inertia of the seventh Coriolis mass with respect to the x-axis may be substantially equal to the moment of inertia of the fifth Coriolis mass with respect to the x-axis plus the moment of inertia of the eighth Coriolis mass with respect to the x-axis.

The moments of inertia of the first, second, third and fourth Coriolis masses with respect to the y1-axis and the moments of inertia of the fifth, sixth, seventh and eighth Coriolis masses with respect to the x-axis may all be substantially equal.

More generally, the following four sums may be substantially equal: (1) the moment of inertia of the second Coriolis mass with respect to the y1-axis plus the moment of inertia of the third Coriolis mass with respect to the y1-axis, (2) the moment of inertia of the first Coriolis mass with respect to the y1-axis plus the moment of inertia of the fourth Coriolis mass with respect to the y1-axis, (3) the moment of inertia of the sixth Coriolis mass with respect to the x-axis plus the moment of inertia of the seventh Coriolis mass with respect to the x-axis, (4) the moment of inertia of the fifth Coriolis mass with respect to the x-axis plus the moment of inertia of the eighth Coriolis mass with respect to the x-axis.

This eight-mass system can be driven in two different primary oscillation modes, as indicated above in the comparison between the movement of the first Coriolis mass 511 and the fifth Coriolis mass 515. FIG. 5a illustrates the first primary oscillation mode where the fifth Coriolis mass 515 moves away from the first center point when the first Coriolis mass 511 moves towards it, and vice versa. As seen in the figure, this also means that the second Coriolis mass 512 moves away from the first center point when the sixth Coriolis mass 516 moves towards it, and so on with the other corresponding pairs (513 and 517, 514 and 518) where one mass is aligned on the x-axis and the other on the y1-axis.

In each Coriolis pair, the two masses which form the pair oscillate in anti-phase. Furthermore, the oscillation phase of the third (515+516) and fourth (517+518) Coriolis pairs with respect to their respective anchor points is anti-phase in relation to the oscillation phase of the first (511+512) and second (513+514) Coriolis pairs with respect to their respective anchor points in this first primary oscillation mode.

The first and second peripheral suspension arrangements illustrated in FIG. 3a can be used also in the third and fourth peripheral suspension arrangements 534 and 535.

Figure 5B:
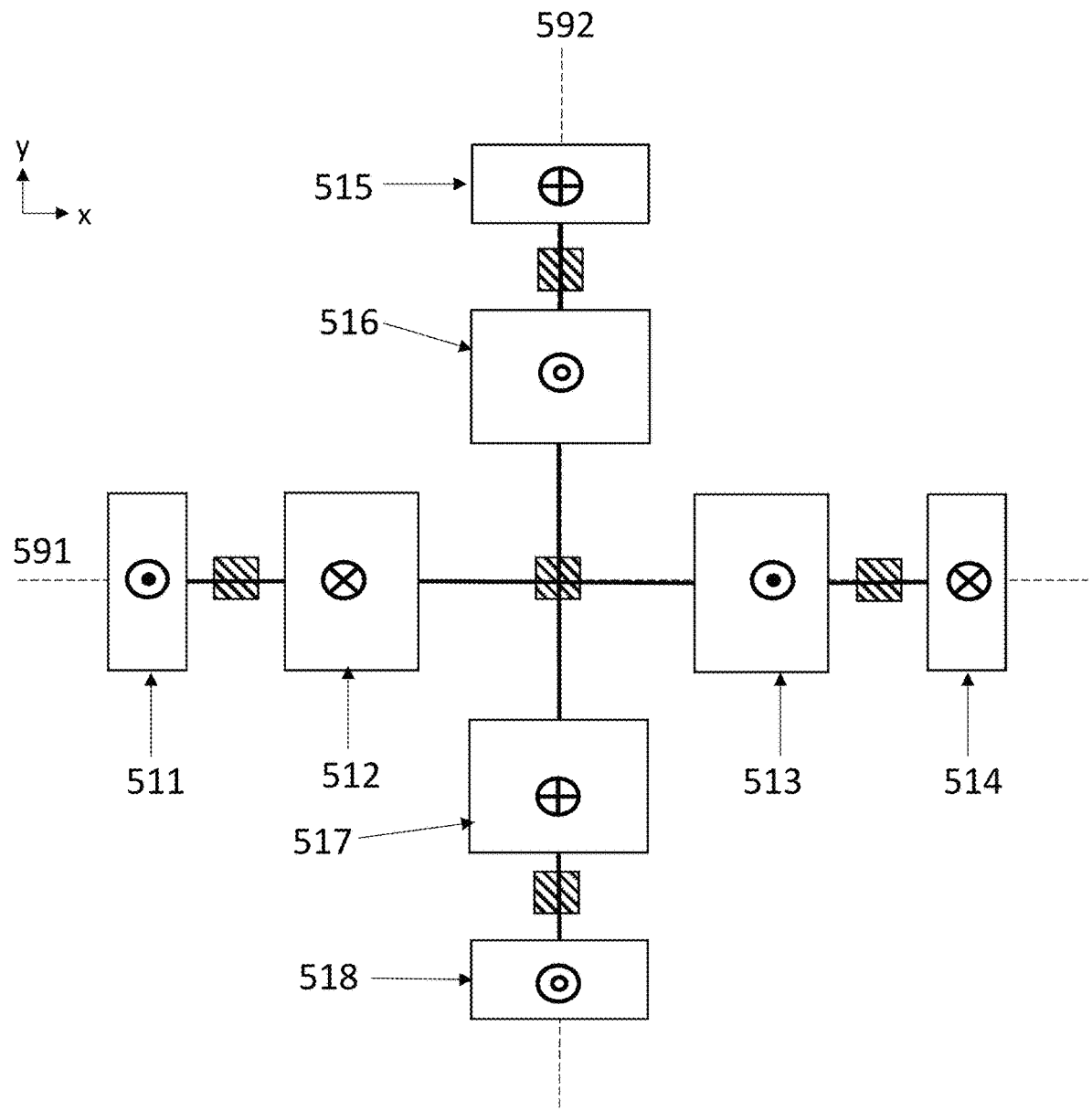

FIG. 5b illustrates the x-axis and y-axis secondary oscillation modes which are generated when the first and second sets of Coriolis masses are driven in the first primary oscillation mode and the gyroscope then undergoes angular rotation about the x-axis and/or the y-axis, respectively.

Figure 5C:
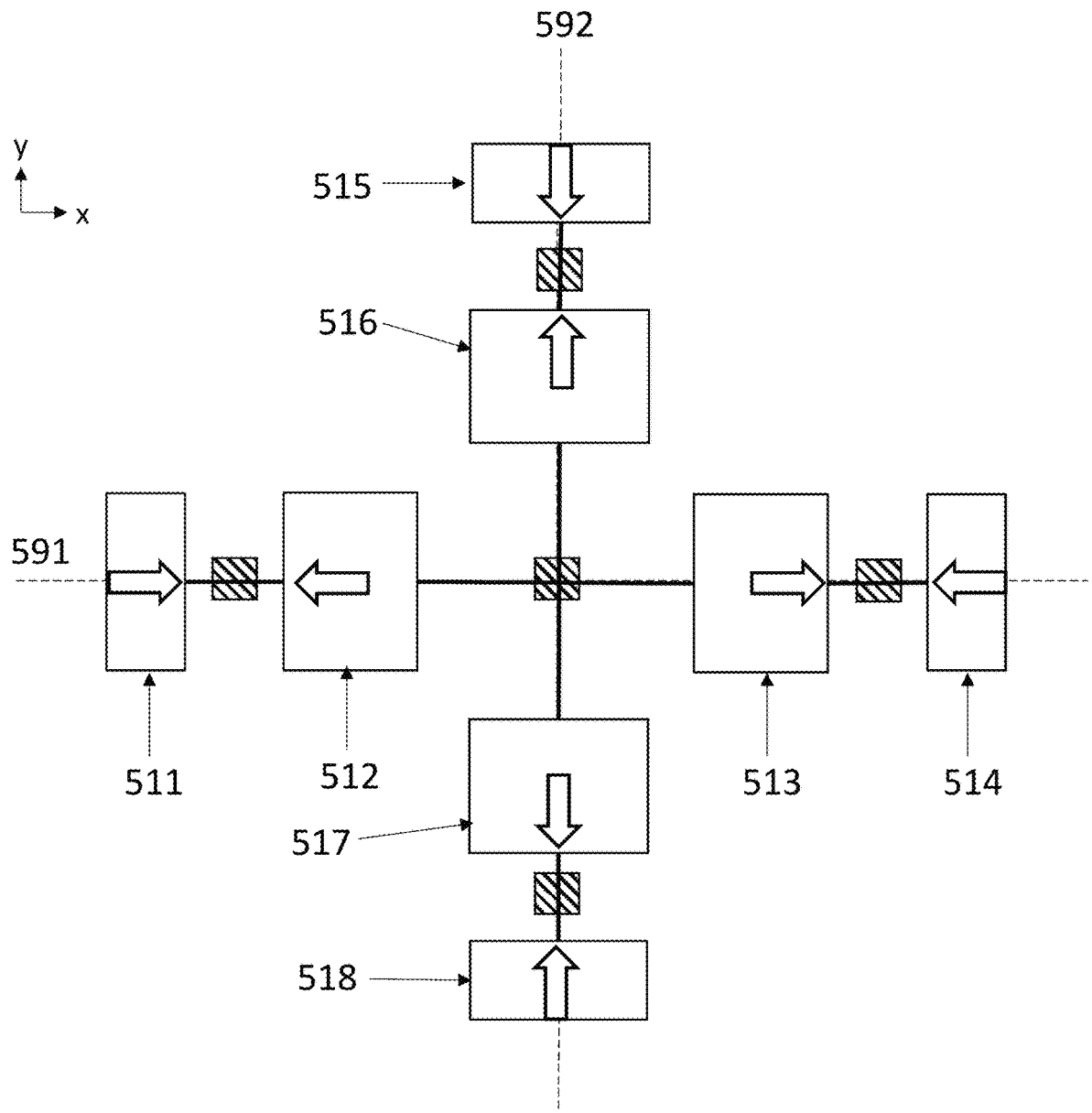

FIG. 5c illustrates the second primary oscillation mode where the fifth Coriolis mass 515 moves towards the first center point when the first Coriolis mass 511 moves towards it, and the fifth Coriolis mass 515 also moves away from the first center point when the first Coriolis mass 511 moves away from it. As seen in the figure, this also means that the second Coriolis mass 512 moves away from the first center point when the sixth Coriolis mass 516 moves away from it, and so on.

As in the first primary oscillation mode, in this second primary oscillation mode the two masses which form the pair again oscillate in anti-phase. However, in this second primary oscillation mode the oscillation phase of the first (511+512), second (513+514), third (515+516) and fourth (517+518) Coriolis pairs with respect to their respective anchor points is the same. In other words, at the illustrated instant of the oscillation cycle all Coriolis masses move towards their respective peripheral anchor point simultaneously, while at the opposite side of the oscillation cycle (not illustrated) all Coriolis masses move away from their respective peripheral anchor point.

Figure 5D:
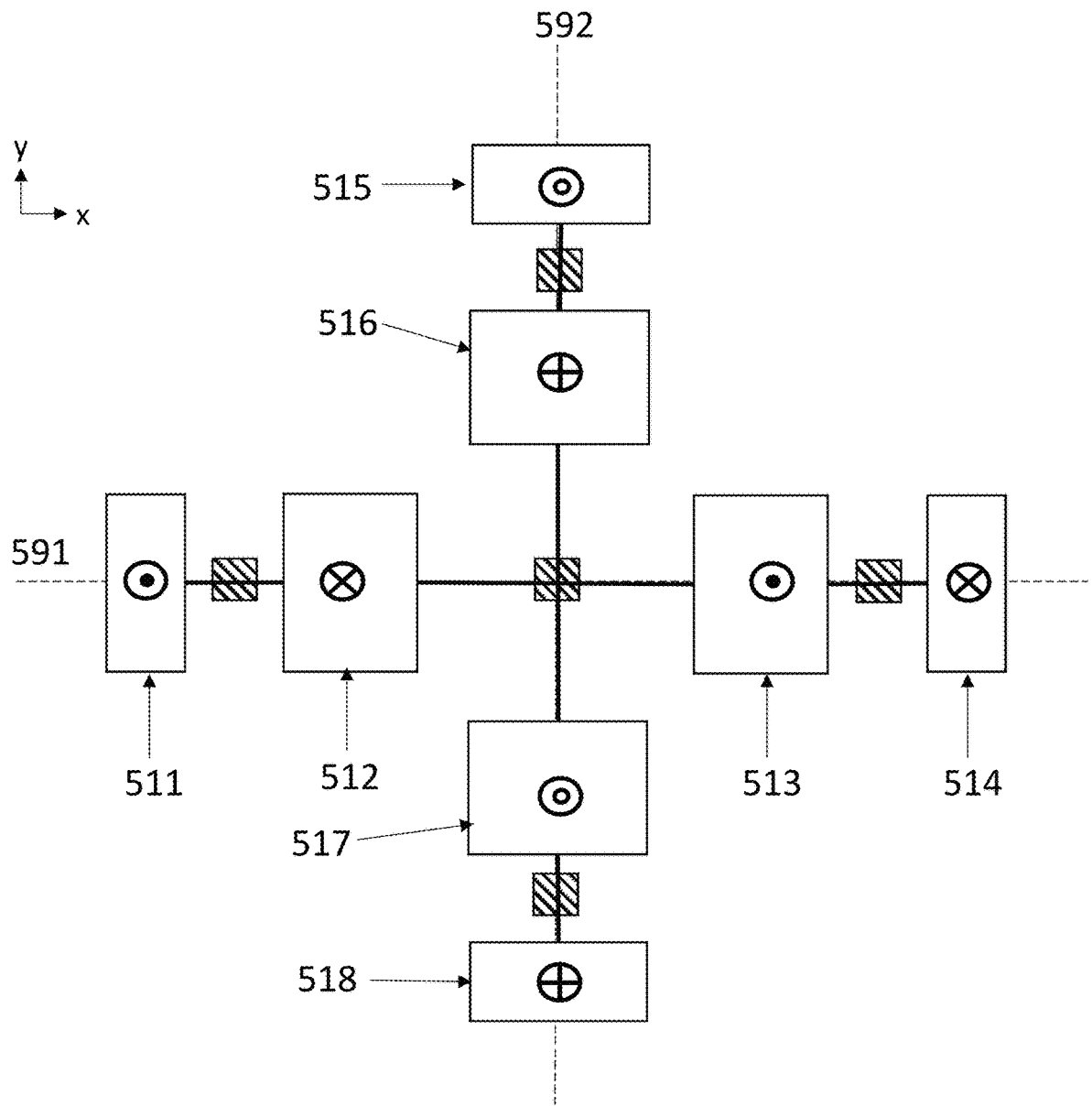

FIG. 5d illustrates the x-axis and y-axis secondary oscillation modes which are generated when the first and second sets of Coriolis masses are driven in the second primary oscillation mode and the gyroscope then undergoes angular rotation about the x-axis and/or the y-axis, respectively.

The moments of inertia of the fifth, sixth, seventh and eighth Coriolis mass elements with respect to the x-axis 591 may all be substantially equal to the moments of inertia of the first, second, third and fourth Coriolis mass elements with respect to the y1-axis 592.

Figure 5E:
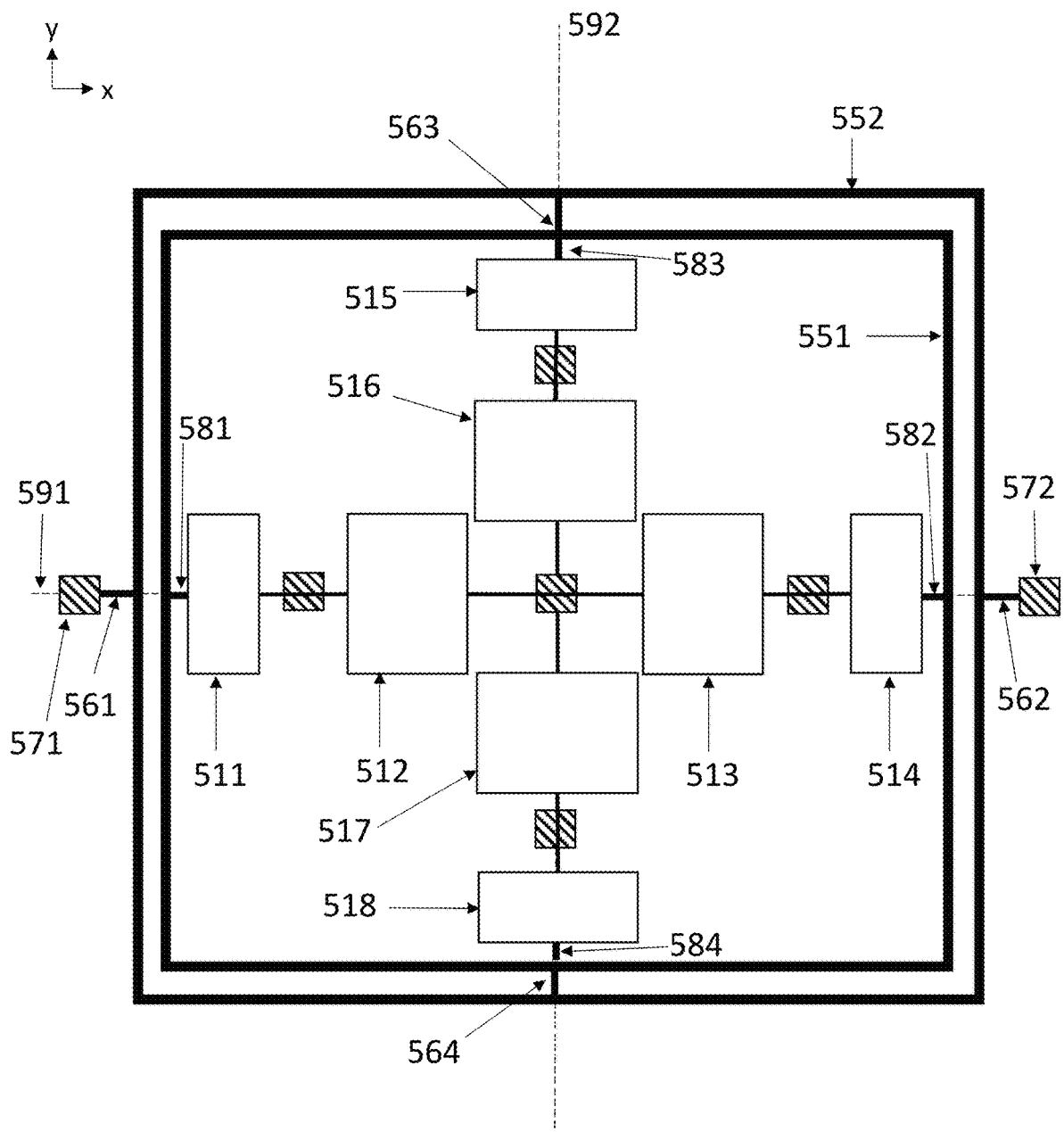
FIGS. 5e-5f illustrate gimbal and frame structures.

A gimbal structure may be implemented around the first and second sets of Coriolis masses to synchronize the secondary oscillation modes illustrated in FIGS. 5b and 5d. FIG. 5e illustrates a gyroscope which comprises a peripheral gimbal structure which surrounds the first and second sets of Coriolis masses. The peripheral gimbal structure comprises an inner gimbal frame 551 and an outer gimbal frame 552. The outer gimbal frame 552 is suspended with two gimbal torsion bars (561, 562) from two gimbal anchor points (571, 572) aligned on opposite sides of the first set of Coriolis masses on a first gimbal axis. The first gimbal axis is always one of the x-axis or the y1-axis, and it is the x-axis 591 in the illustrated case. The inner gimbal frame 551 is suspended from the outer gimbal frame 552 by two additional gimbal torsion bars (563, 564) aligned on opposite sides of the second set of Coriolis masses on a second gimbal axis. The second gimbal axis is always the other one of the x-axis or the y1-axis, so it is the y1-axis 592 in the illustrated case. The inner gimbal frame 551 is attached to the Coriolis pairs (511+512 and 513+514) aligned on the first gimbal axis and to the Coriolis pairs (515+516 and 517+518) aligned on the second gimbal axis. This attachment has been illustrated with connection bars 581-584.

The first central suspension arrangement 533 may also be a gimbal structure which facilitates simultaneous out-of-plane movement in masses 512, 513, 516 and 517 in FIGS. 5b and 5d. Examples of such central suspension structures will be presented below.

Figure 5F:
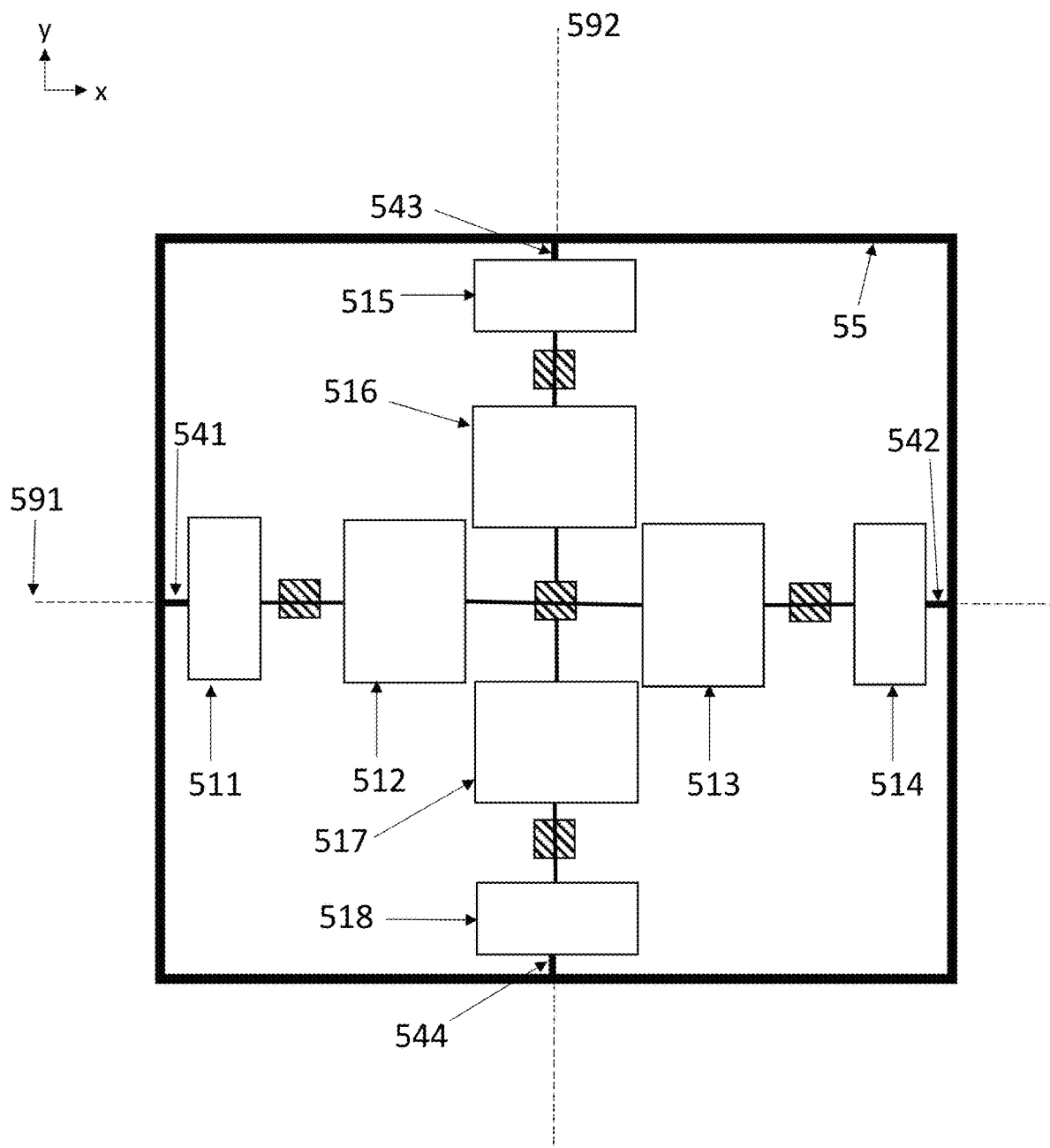

The secondary oscillation modes shown in FIGS. 5b and 5d can alternatively be synchronized with a single frame 55 without a peripheral gimbal structure, as FIG. 5f illustrates. In this case the single frame may be attached to the first, fourth, fifth and eighth Coriolis masses 511, 514, 515 and 518 with connectors 541-544. Without peripheral anchoring the single frame 55 does not provide extra stiffness against external vibrations occurring in the direction of the z-axis, like the gimbal structure of FIG. 5e does. However, the single frame does provide synchronization of the secondary oscillation modes while consuming little extra surface area. The gimbal and frame structures shown in FIGS. 5e and 5f can be implemented in any of the practical examples presented below.

XYZ-Axis Embodiment

Figure 6:
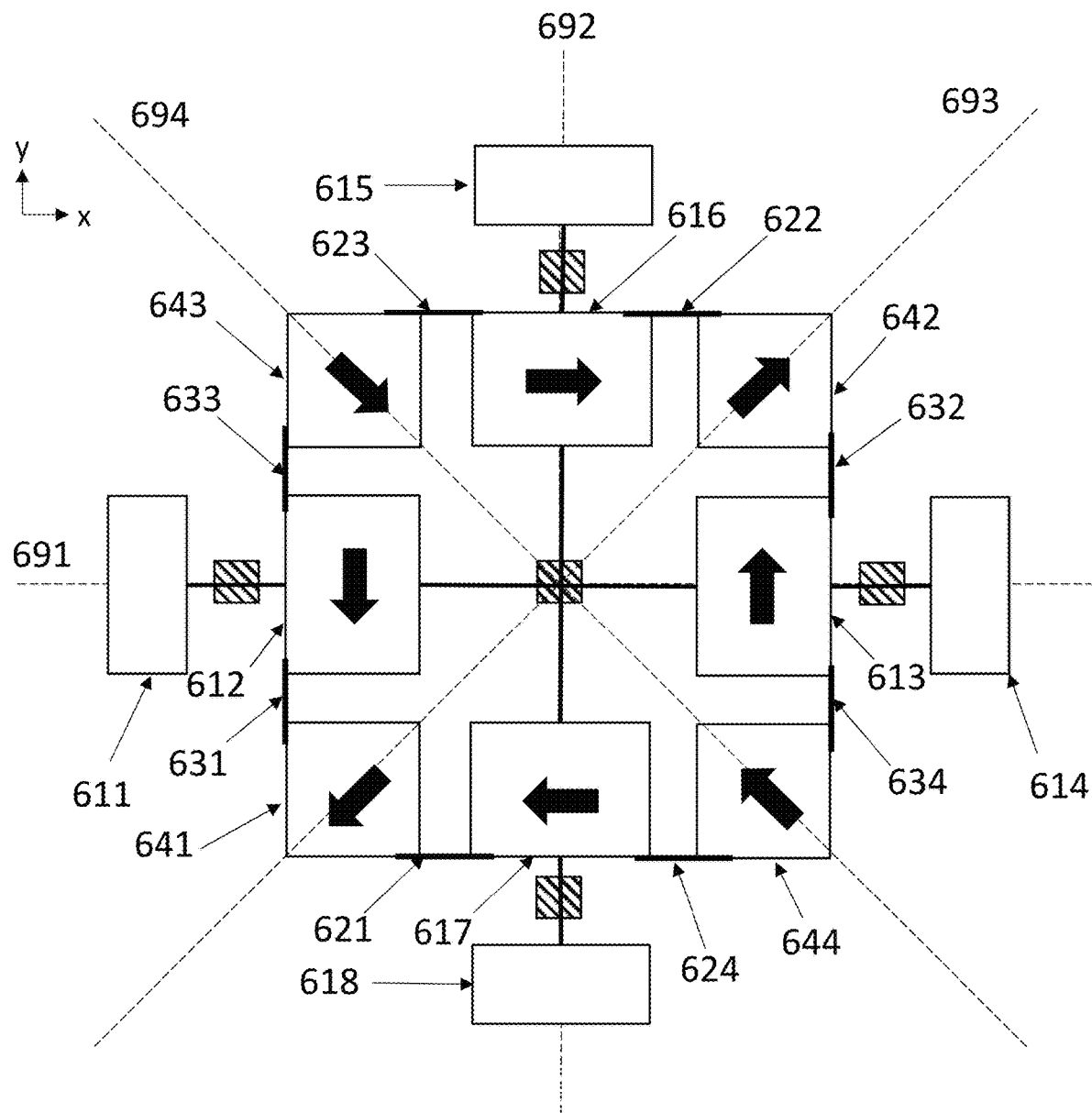
FIG. 6 illustrates a first secondary oscillation mode and additional detection masses.

The XY-embodiment where the first and second sets of Coriolis masses are driven in the first primary oscillation mode illustrated in FIG. 5a can be expanded to a XYZ-gyroscope by configuring the central and peripheral suspension arrangement so that they flexibly accommodate also a first z-axis secondary oscillation mode, which is illustrated in FIG. 6. Reference numbers 611-618 and 691-692 correspond to reference numbers 511-518 and 591-592, respectively, in FIG. 5a. In this secondary oscillation mode Coriolis masses 612, 613, 616 and 617 all move tangentially in relation to the first center point in the directions shown in the figure. In the opposite half of the oscillation cycle, each of these Coriolis masses moves in the opposite direction.

The gyroscope should then also comprise sense transducers for detecting the oscillation of Coriolis masses 612, 613, 616 and 617 in the first z-axis secondary oscillation mode, which is induced by the Coriolis force when the gyroscope undergoes angular rotation about the z-axis. However, the tangential oscillation of Coriolis masses 612, 613, 616 and 617 may be a mixture of translational and rotational movement, which may in some cases make it difficult to accurately detect z-axis secondary oscillation amplitudes from the movement of these masses. Additional detection masses 641-644 may therefore be added to the gyroscope. The diagonal motion of the detection masses (in relation to the first center point) facilitates easier detection of the first z-axis secondary oscillation mode.

The illustrated gyroscope comprises first, second, third and fourth detection masses 641-644 which together form a detection mass quartet which in its rest position is arranged symmetrically around the gyroscope first center point. The first and second detection masses 641 and 642 are aligned on a first diagonal axis 693 which crosses the lateral axis 691 and the transversal axis 692 at an angle of 45 degrees and crosses the gyroscope first center point. The third and fourth detection masses 643 and 644 are aligned on a second diagonal axis 694 which is orthogonal to the first diagonal axis 693 and crosses the gyroscope first center point. One or more lateral corner springs 621-624 extend to each detection mass (641-644, respectively) from the laterally adjacent Coriolis mass. One or more transversal corner springs 631-634 extend to each detection mass (641-644, respectively) from the transversally adjacent Coriolis mass.

In other words, first and fourth lateral corner springs 621 and 624 extend from the seventh Coriolis mass 617 to the first (641) and the fourth (644) detection masses, respectively, as illustrated in FIG. 6. Second and third lateral corner springs 622 and 623 extend from the sixth Coriolis mass 616 to the second (642) and the third (643) detection masses, respectively. First and third transversal corner springs 631 and 633 extend from the second Coriolis mass 612 to the first (641) and the third (643) detection masses, respectively, while second and fourth transversal corner springs 632 and 634 extend from the third Coriolis mass 613 to the second (642) and the fourth (644) detection masses, respectively.

When the Coriolis masses 612, 613, 616 and 617 oscillate tangentially in the first z-axis secondary oscillation mode, this tangential oscillation is transmitted to the detection masses by the lateral and transversal corner springs. The oscillation of proof masses 612 and 616 in opposite tangential directions pulls detection mass 643 toward the gyroscope first center point, while the oscillation of proof masses 612 and 617 in opposite directions pushes detection mass 641 away from the gyroscope first center point. Detection masses 641-644 can be suspended with arrangements which flexibly facilitate movement along the diagonal axes 693 and 694. Since the momentum imparted by the corner springs in the lateral and transversal directions is equal (or very close to equal), the detection masses can then move in radial oscillation in the manner illustrated in FIG. 6.

The one or more lateral corner springs are stiff in the lateral direction and flexible in the transversal direction, while the transversal corner springs are stiff in the transversal direction and flexible in the lateral direction. In other words, due to their dimensions, all corner springs have the radial flexibility needed for flexibly accommodating the first primary oscillation mode but are much stiffer in the tangential direction.

This means that the primary oscillation mode of the first and second sets of Coriolis masses will not set the detection masses 641-644 in motion. Instead, detection masses 641-644 will remain substantially stationary unless the gyroscope undergoes rotation about the z-axis.

Each detection mass may be suspended from a diagonally placed anchor point (not illustrated) which lies on the diagonal axis (693, 694) on which the detection mass is aligned. The diagonal anchor point may, for example, be located within an opening formed in said detection mass. The transversal corner springs and the lateral corner springs (and/or the fasteners with attach these springs to the proof masses and the detection masses) may exhibit sufficient flexibility in the vertical direction (or torsional flexibility in the case of the fasteners) to accommodate the out-of-plane motion of Coriolis masses 612, 613, 616 and 617 in the x-axis or y-axis secondary oscillation modes while the detection masses 641-644 remain within the xy-plane. The z-axis secondary mode measurements will therefore not be easily disturbed by the proof mass movement which may arise in simultaneously occurring x- and/or y-axis secondary oscillation.

Capacitive sense transducers may be implemented either within openings in one or more detection masses, or adjacent to one or more detection masses, to detect their illustrated radial movement in the first z-axis secondary oscillation mode.

Figure 7:
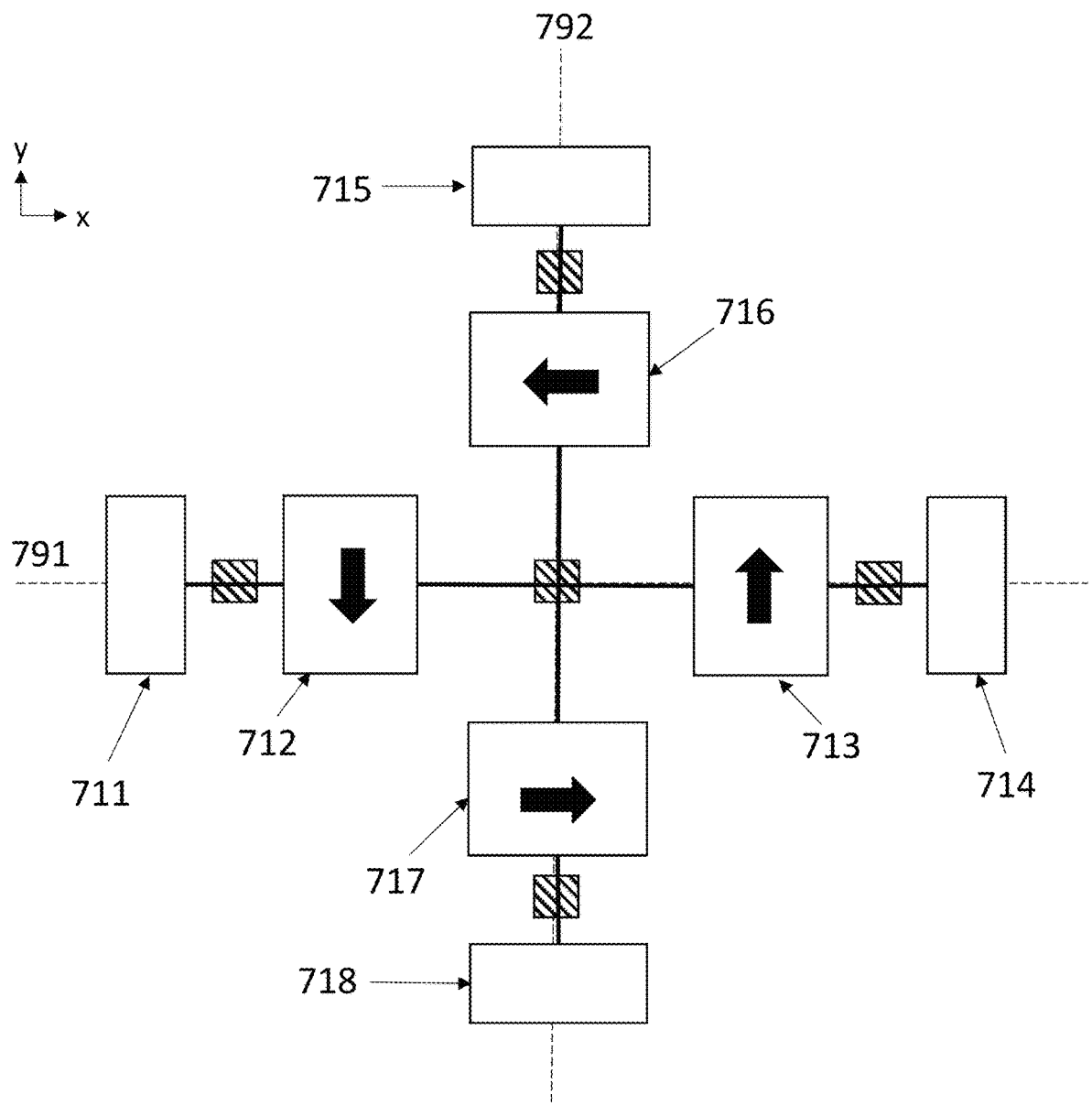
FIG. 7 illustrates a second secondary oscillation mode.

The XY-embodiment where the first and second sets of Coriolis masses are driven in the second primary oscillation mode illustrated in FIG. 5c can be expanded to a XYZ-gyroscope by configuring the central and peripheral suspension arrangement so that they flexibly accommodate a second z-axis secondary oscillation mode, which is illustrated in FIG. 7. Reference numbers 711-718 and 791-792 correspond to reference numbers 511-518 and 591-592, respectively, in FIG. 5c. In this second z-axis secondary oscillation mode Coriolis masses 712, 713, 716 and 717 all move in the same tangential direction in relation to the first center point. In the opposite half of the oscillation cycle, each of these Coriolis masses moves in the opposite tangential direction. Capacitive sense transducers may be implemented either within openings in Coriolis masses 712, 713, 716 and 717, or adjacent to one or more of these Coriolis masses, to detect their movement in the second z-axis secondary oscillation mode. It would also be possible in FIG. 7 to utilize additional detection masses such as 641-644 in FIG. 6 and connect sense transducers to them.

Two-Sided Embodiments

Figure 8A:
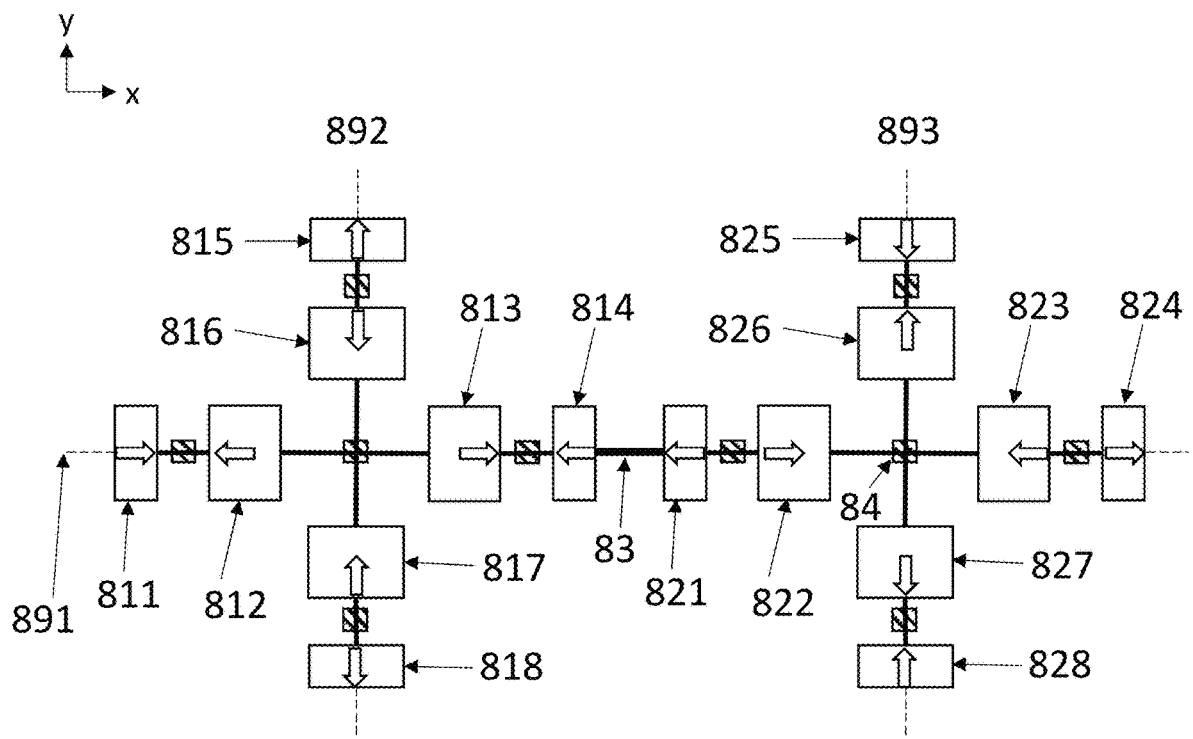
FIGS. 8a-8b illustrate two-sided gyroscope structures and their oscillation modes.
Figure 8B:
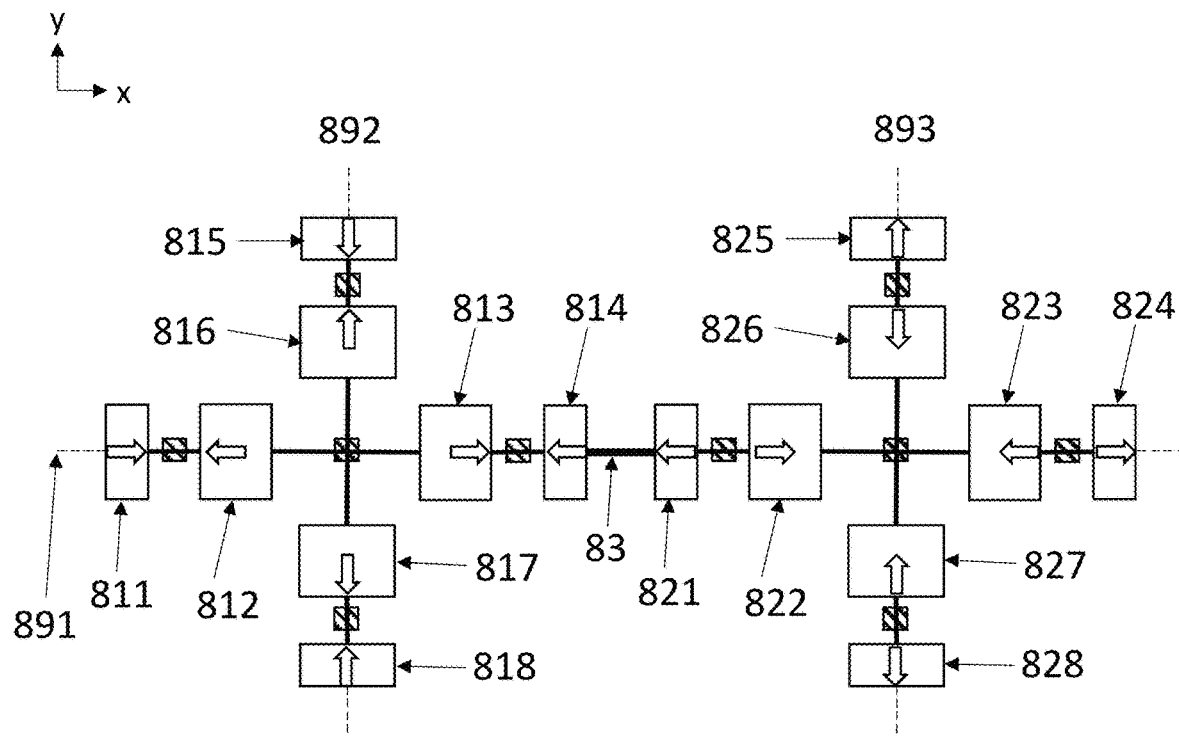

Additional stability and robustness can be gained with the two-sided structures illustrated in FIGS. 8a and 8b. Reference numbers 811-818 and 891-892 correspond here to reference numbers 511-518 and 591-592, respectively, in FIG. 5a.

Furthermore, the peripheral suspension arrangements illustrated in FIGS. 3a and 4a can be implemented in any Coriolis pair shown in FIGS. 8a-8b, and the peripheral gimbal structure illustrated in FIG. 5a may be implemented around the first and second sets of Coriolis masses 811-818 or around the third and fourth sets of Coriolis masses which are presented below.

FIGS. 8a-8b show a gyroscope which comprises a third set of Coriolis masses which comprises a ninth (821) and a tenth (822) Coriolis mass which together form a fifth Coriolis pair which in its rest position is aligned on the x-axis on a first side of a transversal y2-axis 893. The tenth Coriolis mass 822 is closer to the y2-axis 893 than the ninth (821). The x-axis 891 crosses the y2-axis 893 orthogonally at a second center point. The third set of Coriolis masses further comprises an eleventh (823) and a twelfth (824) Coriolis mass which together form a sixth Coriolis pair which in its rest position is aligned on the x-axis 891 on a second side of the y2-axis 893. The eleventh Coriolis mass 823 is closer to the y2-axis 893 than the twelfth (824). The second side of the y2-axis is opposite to the first. The ninth Coriolis mass 821 may optionally be connected to the fourth Coriolis mass 814 with a lateral synchronization bar 83.

The gyroscope further comprises a fourth set of Coriolis masses which comprises a thirteenth (825) and a fourteenth (826) Coriolis mass which together form a seventh Coriolis pair which in its rest position is aligned on the y2-axis 893 on a first side of the x-axis 891. The fourteenth Coriolis mass 826 is closer to the x-axis 891 than the thirteenth (825). The fourth set of Coriolis masses further comprises a fifteenth (827) and a sixteenth (828) Coriolis mass which together form an eighth Coriolis pair which in its rest position is aligned on the y2-axis 893 on a second side of the x-axis 891. The fifteenth Coriolis mass 827 is closer to the y2-axis 893 than the sixteenth 828.

The gyroscope also comprises a set of fifth peripheral anchor points on the first side of the y2-axis 893 and a fifth peripheral suspension arrangement which suspends the fifth Coriolis pair from the set of fifth peripheral anchor points and a set of sixth peripheral anchor points on the second side of the y2-axis 893 and a sixth peripheral suspension arrangement which suspends the sixth Coriolis pair from the set of sixth peripheral anchor points. The gyroscope also comprises a set of seventh peripheral anchor points on the first side of the x-axis 891 and a seventh peripheral suspension arrangement which suspends the seventh Coriolis pair from the set of seventh peripheral anchor points, and a set of eighth peripheral anchor points on the second side of the x-axis 891 and an eighth peripheral suspension arrangement which suspends the eighth Coriolis pair from the set of eighth peripheral anchor points.

The fifth, sixth, seventh and eighth sets of peripheral anchor points are illustrated in FIGS. 8a-8b with a single anchor point with the same convention as in FIGS. 2a and 5a above. As mentioned in connection to FIG. 2a and illustrated in practice in FIGS. 3a and 4a, these sets of peripheral anchor points may in each case comprise more than one anchor point. This applies also to the sets shown in FIGS. 8a-8b.

The gyroscope shown in FIGS. 8a-8b further comprises a second central suspension arrangement which suspends the fifth, sixth, seventh and eighth Coriolis pairs from one or more second central anchor points 84 located substantially at the second center point. The second central suspension arrangement and the fifth, sixth, seventh and eighth peripheral suspension arrangements flexibly accommodate the primary oscillation mode and the x-axis and y-axis secondary oscillation modes. To preserve clarity, the second central suspension arrangement is illustrated in FIGS. 8a-8b in the same schematic manner as the first central suspension arrangement in FIGS. 2a and 5a. As mentioned in connection to FIG. 2a, there may be more than one second central anchor point. This applies also to the sets shown in FIGS. 8a-8b.

As illustrated in FIGS. 8a-8b, in the primary oscillation mode the third set of Coriolis masses is configured to oscillate so that the tenth (822) and eleventh (823) Coriolis masses move in linear translation along the x-axis 891 away from the second center point when the ninth (821) and twelfth (824) Coriolis masses move in linear translation along the x-axis towards the second center point, and vice versa (which is the part of the oscillation cycle which is shown in FIGS. 8a-8b). In the primary oscillation mode the fourth set Coriolis masses is configured to oscillate so that the fourteenth (826) and fifteenth (827) Coriolis masses move in linear translation along the y2-axis 893 away from the second center point when the thirteenth (825) and sixteenth (828) Coriolis masses move in linear translation along the y2-axis 893 towards the second center point, and vice versa.

In the y-axis secondary oscillation mode the third set of Coriolis masses is configured to oscillate so that the ninth (821), tenth (822), eleventh (823) and twelfth (824) Coriolis masses undergo vertical motion wherein the ninth (821) and eleventh (823) Coriolis masses move up when the tenth (822) and twelfth Coriolis masses move down (824), and vice versa. This movement corresponds to the movement of the first set of masses in FIG. 2d and is not illustrated here separately.

In the x-axis secondary oscillation mode, the fourth set of Coriolis masses is configured to oscillate so that the thirteenth (825), fourteenth (826), fifteenth (827) and sixteenth (828) Coriolis masses undergo vertical motion wherein the thirteenth (825) and fifteenth (827) Coriolis masses move up when the fourteenth (826) and sixteenth (828) Coriolis masses move down, and vice versa.

In the primary oscillation mode the ninth Coriolis mass 821 always moves away from the second center point when the fourth Coriolis mass 814 moves towards the first center point, and vice versa. FIGS. 8a and 8b illustrate first and second primary oscillation modes. In FIG. 8a, the thirteenth Coriolis mass 825 moves away from the first center point when the ninth Coriolis mass 821 moves towards the second center point, and vice versa. In FIG. 8b, the thirteenth Coriolis mass 825 and the ninth Coriolis mass 821 move away from and towards the second center point at the same time.

In other words, the first primary oscillation mode which was introduced in FIG. 5a can be used simultaneously for the first and second sets of Coriolis masses and for the third and fourth sets of Coriolis masses as FIG. 8a illustrates. Masses 822 and 823 then move toward the second center point when masses 826 and 827 move away from it, and vice versa. This may be called differential oscillation with respect to the central anchor point, and the same differential oscillation occurs (with opposite phase) also in the outer masses 821, 824, 825 and 828.

Differential oscillation also takes place in the same manner among the first and second sets of masses 811-818, as FIG. 8a illustrates. Since masses 814 and 821 are in this case connected by the lateral synchronization bar 83 which is stiff in the lateral direction (but may be flexible in the transversal direction), these two masses always move in the same lateral direction (left or right in the figures). This synchronizes the first primary oscillation mode so that, if we say that each mass 811-818 on the left side of the gyroscope has a corresponding mass 821-828 on the right side of the gyroscope, then the masses which correspond to each other always move in the opposite phase with respect to their respective central anchor points. For example, 811 moves toward the first center point when 821 moves away from the second center point, 812 moves away from the first center point when 822 moves toward the second center point, 818 moves away from the first center point when 828 moves toward the second center point, and so on.

The x-axis and y-axis secondary oscillation modes which are generated when the first, second, third and fourth sets of Coriolis masses are driven in the first primary oscillation mode and the gyroscope then undergoes angular rotation about the x-axis and/or the y-axis correspond to the modes illustrated in FIG. 5b insofar as the first and second sets are concerned, while each mass in the third and fourth sets will simultaneously oscillate in the opposite vertical direction than the corresponding mass in the first and second sets, respectively, in the x-axis and y-axis secondary oscillation modes.

Figure 12:
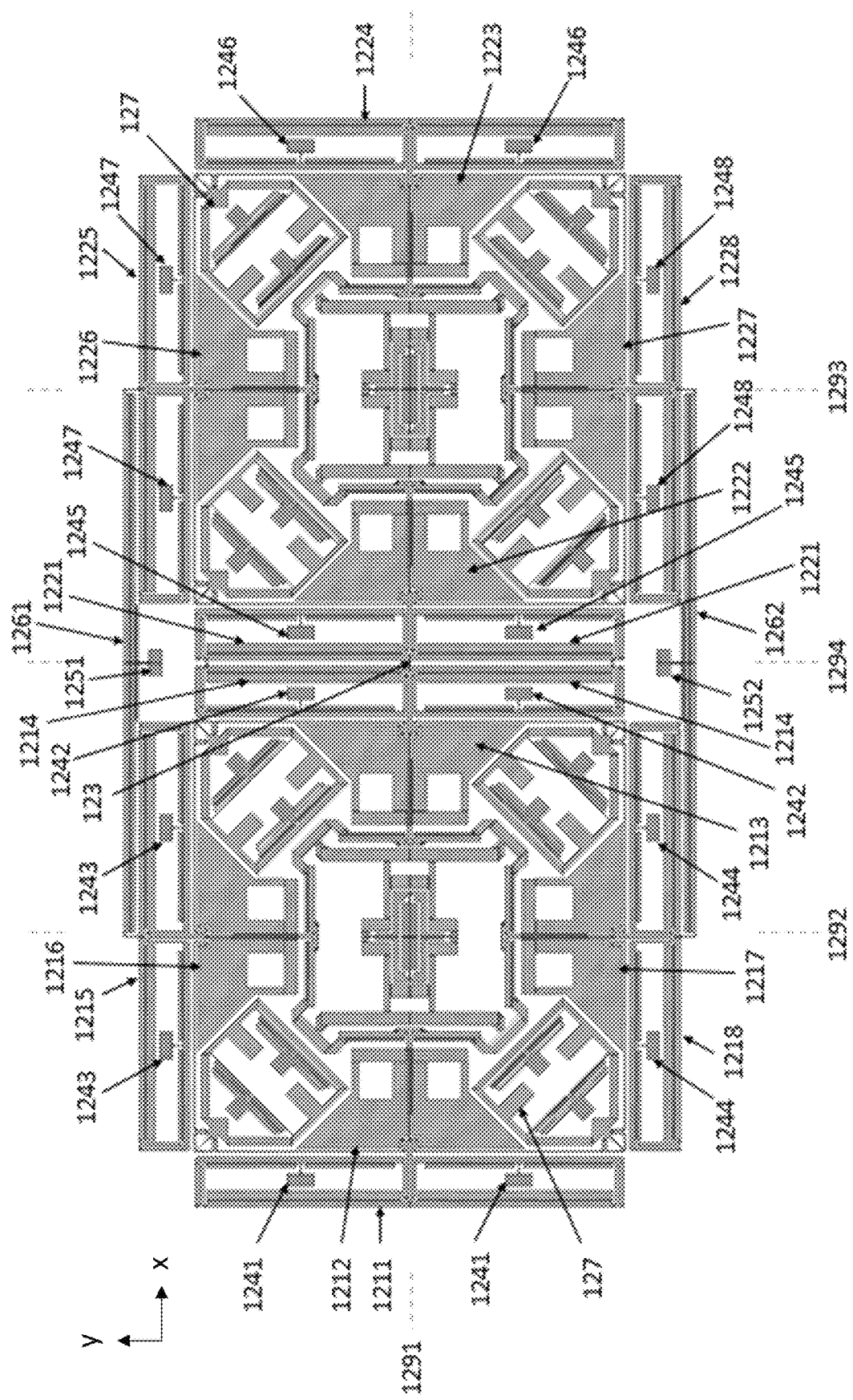
FIG. 12 illustrates a fourth practical example.

This opposite-phase oscillation follows the logic described in the previous paragraph, and it may be noted that one consequence of this synchronization is that masses 814 and 821 in FIG. 8a will move in the same vertical direction when the gyroscope undergoes rotation about the y-axis. The optional lateral synchronization bar 83 may be stiff in the vertical direction so that it also synchronizes the movement of these two masses in the y-axis secondary oscillation mode. Furthermore, as illustrated in FIG. 12 below, masses 815 818 may be connected to masses 825 and 828, respectively, with seesaws which synchronize their movement in the x-axis secondary oscillation mode. 815 moves up when 825 moves down, and vice versa. Masses 818 and 828 move in the same manner.

As mentioned above, in FIG. 8b the thirteenth Coriolis mass 825 and the ninth Coriolis mass 821 move away from and towards the second center point at the same time.

In other words, the second primary oscillation mode which was introduced in FIG. 5c can be used simultaneously for the first and second sets of Coriolis masses and for the third and fourth sets of Coriolis masses as FIG. 8b illustrates. In this mode masses 822, 823, 826 and 827 all move toward and away from the second center point simultaneously. This may be called beating heart oscillation with respect to the central anchor point, and the same beating heart oscillation occurs (with opposite phase) also in the outer masses 821, 824, 825 and 828.

Beating heart oscillation also takes place in the same manner among the first and second sets of masses 811-818, as FIG. 8b illustrates. Masses 814 and 821 are here again connected by the optional lateral synchronization bar 83 which is stiff in the lateral direction, which means that these two masses always move in the same lateral direction (left or right in the figures). This synchronizes the second primary oscillation mode so that, if we say that each mass 811-818 on the left side of the gyroscope again corresponds to a mass 821-828 on the right side of the gyroscope, then the masses which correspond to each other always move in the opposite phase with respect to their respective central anchor points.

The x-axis and y-axis secondary oscillation modes which are generated when the first, second, third and fourth sets of Coriolis masses are driven in the second primary oscillation mode and the gyroscope then undergoes angular rotation about the x-axis and/or the y-axis correspond to the modes illustrated in FIG. 5d insofar as the first and second sets are concerned. As in FIG. 8a, each mass in the third and fourth sets will also in FIG. 8b simultaneously oscillate in the opposite vertical direction as the corresponding mass in the first and second sets, respectively, in the x-axis and y-axis secondary oscillation modes. Masses 814 and 821 will therefore also in FIG. 8b move in the same vertical direction when the gyroscope undergoes rotation about the y-axis.

The moment of inertia of the tenth Coriolis mass with respect to the y2-axis plus the moment of inertia of the eleventh Coriolis mass with respect to the y2-axis may be equal to the moment of inertia of the ninth Coriolis mass with respect to the y2-axis plus the moment of inertia of the twelfth Coriolis mass with respect to the y2-axis.

The moment of inertia of the fourteenth Coriolis mass with respect to the x-axis plus the moment of inertia of the fifteenth Coriolis mass with respect to the x-axis may be equal to the moment of inertia of the thirteenth Coriolis mass with respect to the x-axis plus the moment of inertia of the sixteenth Coriolis mass with respect to the x-axis.

The moments of inertia of the first, second, third and fourth Coriolis masses with respect to the y1-axis and the moments of inertia of the fifth, sixth, seventh and eighth Coriolis masses with respect to the x-axis and the moments of inertia of the ninth, tenth, eleventh and twelfth Coriolis masses with respect to the y2-axis and the moments of inertia of the thirteenth, fourteenth, fifteenth and sixteenth Coriolis masses with respect to the x-axis may all be substantially equal.

More generally, the following eight sums may be substantially equal: (1) the moment of inertia of the second Coriolis mass with respect to the y1-axis plus the moment of inertia of the third Coriolis mass with respect to the y1-axis, (2) the moment of inertia of the first Coriolis mass with respect to the y1-axis plus the moment of inertia of the fourth Coriolis mass with respect to the y1-axis, (3) the moment of inertia of the sixth Coriolis mass with respect to the x-axis plus the moment of inertia of the seventh Coriolis mass with respect to the x-axis, (4) the moment of inertia of the fifth Coriolis mass with respect to the x-axis plus the moment of inertia of the eighth Coriolis mass with respect to the x-axis, (5) the moment of inertia of the tenth Coriolis mass with respect to the y2-axis plus the moment of inertia of the eleventh Coriolis mass with respect to the y2-axis, (6) the moment of inertia of the ninth Coriolis mass with respect to the y2-axis plus the moment of inertia of the twelfth Coriolis mass with respect to the y2-axis, (7) the moment of inertia of the fourteenth Coriolis mass with respect to the x-axis plus the moment of inertia of the fifteenth Coriolis mass with respect to the x-axis, and (8) the moment of inertia of the thirteenth Coriolis mass with respect to the x-axis plus the moment of inertia of the sixteenth Coriolis mass with respect to the x-axis.

The x-axis and y-axis embodiments shown in FIGS. 8a and 8b can be expanded to a z-axis gyroscope in the manner which was illustrated in FIG. 6 above. This will be described in more detail with reference to the practical example in FIG. 12 below.

PRACTICAL EXAMPLES

Figure 9A:
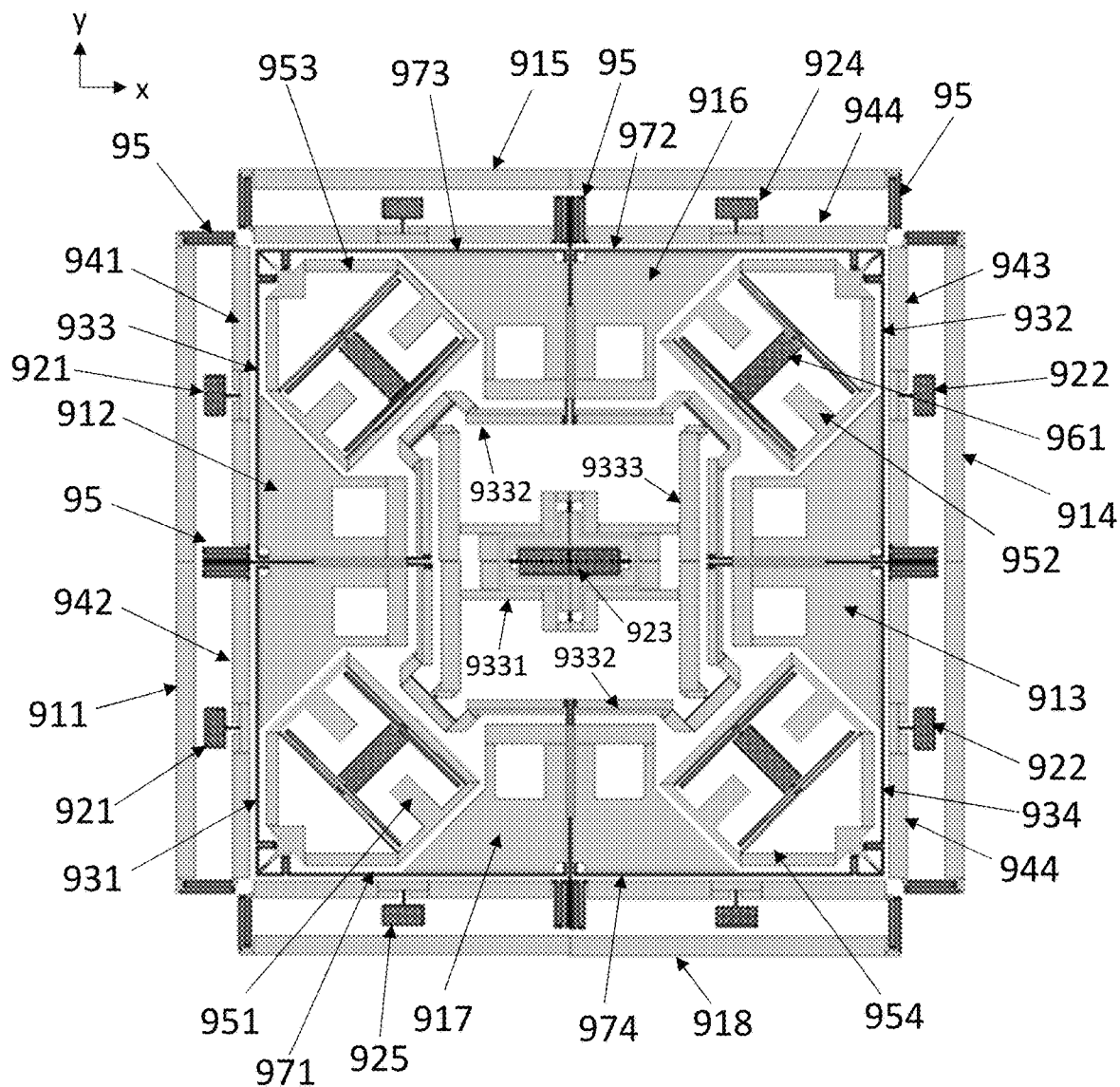
FIGS. 9a-9c illustrate a first practical example.

FIG. 9a illustrates a first example structure where some of the features presented above have been implemented. The gyroscope is suitable for measurement of angular rotation rate about the x-, y and z-axes, but the illustrated elements could also be implemented just for measuring rotation about one of these axes. This also applies to all other examples presented below. Reference numbers 911-918 and 921-925 correspond to reference numbers 511-518 and 521-525, respectively, in FIG. 5a. Furthermore, reference numbers 911-914, 921-922, 941-944 and 95 correspond to reference numbers 311-314, 321-322, 341-344 and 35, respectively, in FIG. 3a and the same peripheral suspension arrangement which was illustrated in FIG. 3a has also been implemented for the third Coriolis pair 915+916 and for the fourth Coriolis pair 917+918. Finally, reference numbers 931-934, 951-954 and 971-974 correspond to reference numbers 631-634, 641-644 and 621-624, respectively, in FIG. 6. This example gyroscope can be driven in the first primary oscillation mode illustrated in FIG. 5a. The corresponding x-axis and y-axis secondary oscillation modes were illustrated in FIG. 5b, and the corresponding first z-axis secondary oscillation mode was illustrated in FIG. 6.

The connecting springs 95 and the anchoring springs which attach seesaws 941-944 to anchor points 921-922 have enough in-plane flexibility to facilitate the primary oscillation movement which FIGS. 3b and 3c illustrate. In the y-axis secondary oscillation mode, the tilting of the seesaws 941-944 facilitates the simultaneous vertical motion described above where the first and third Coriolis masses move up when the second and fourth Coriolis masses move down, and vice versa. This motion is synchronized by the central suspension structure 933 in the manner illustrated in FIG. 2d.

The central suspension structure comprises a central gimbal structure 9331 built around the first central anchor point 923. This gimbal structure is needed to simultaneously facilitate the x-axis and the y-axis secondary oscillation modes—if the gyroscope would measure only one of these secondary oscillation modes, then the central suspension structure could instead be a seesaw structure, as FIG. 2d illustrates. The central suspension structure also comprises a central synchronization structure which accommodates and synchronizes the movement of mass elements 912, 913, 916 and 917 in the primary oscillation mode and the y-axis and x-axis secondary oscillation modes. The central synchronization structure comprises four corner elements 9332 which are connected to said mass elements and to each other with in-plane flexible springs which allow the corner elements to turn in relation to each other as the mass elements move in primary oscillation. Transversal bars 9333 connect the corner elements 9332 to the torsion spring that suspend the gimbal form the central anchor point 923. The bars should preferably be as stiff as possible but leave a convenient opening for the drive structures which drive and control the primary oscillation. The corner elements 9332 and the springs which join them together are stiff in the vertical direction to facilitate the synchronization of the x-axis and y-axis secondary oscillation modes through the central gimbal structure.

More generally, in any embodiment where the first primary oscillation mode shown in FIG. 5*a* or 8*a* is used, the central suspension structure may comprise, around each center point, a suspension arrangement which comprises a symmetrical closed pattern in the device plane which is anchored to the corresponding central anchor point and coupled to each corresponding inner Coriolis mass so that the symmetrical closed pattern will easily contract on the lateral axis with a matching forced expansion on the corresponding transversal axis, and vice versa.

Each of the inner Coriolis masses 912-913 and 916-917 has two openings where drive, quadrature compensation and/or primary sense transducers may be placed. The detection masses 951-954 which are set in motion in the first z-axis secondary oscillation mode also have openings where sense, mode match and/or force feedback transducers may be placed. The diagonal anchor points 961 from which these masses are suspended also lie within such openings. Sense transducers for detecting the movement of Coriolis masses 911-918 in the x-axis and y-axis secondary oscillation modes are not illustrated, but they may be placed above and/or below each Coriolis mass, for example on the inner walls of the enclosure where the gyroscope is packaged or on the substrate.

Figure 9B:
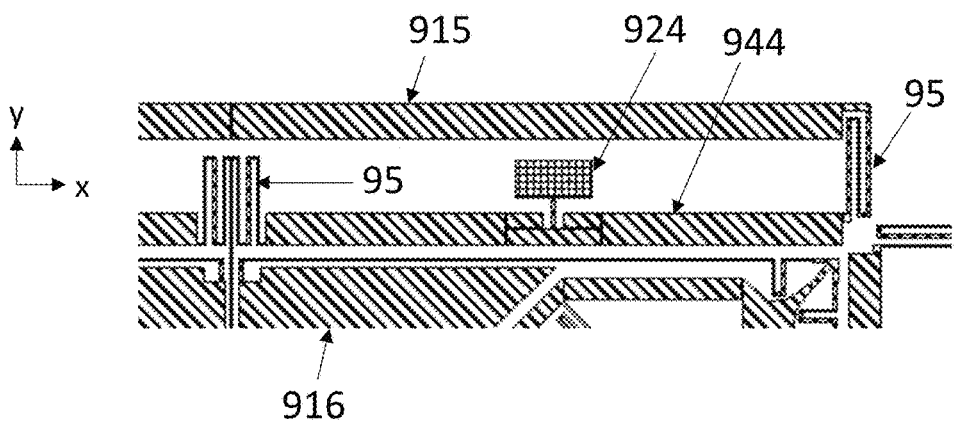

FIG. 9*b* illustrates the connection springs 95 in more detail. In this example the connection springs 95 have a meandering shape in the direction of the x-axis while being relatively wide in the direction of the y-axis. This allows the connection springs to efficiently transfer drive oscillation movement (which is in this case movement along the y-axis) from the sixth Coriolis mass 916 to the lateral seesaw 944 and to the fifth Coriolis mass 915 while still allowing these elements to turn in relation to each other in the device plane in drive oscillation and also out of the device plane in the x-axis secondary oscillation mode shown for example in FIG. 5*b*. Many other geometries which facilitate this movement are also possible in the connection springs 95. These considerations apply to all embodiments where the peripheral suspension structure shown in FIGS. 9*a*-9*b* is used.

Figure 9C:
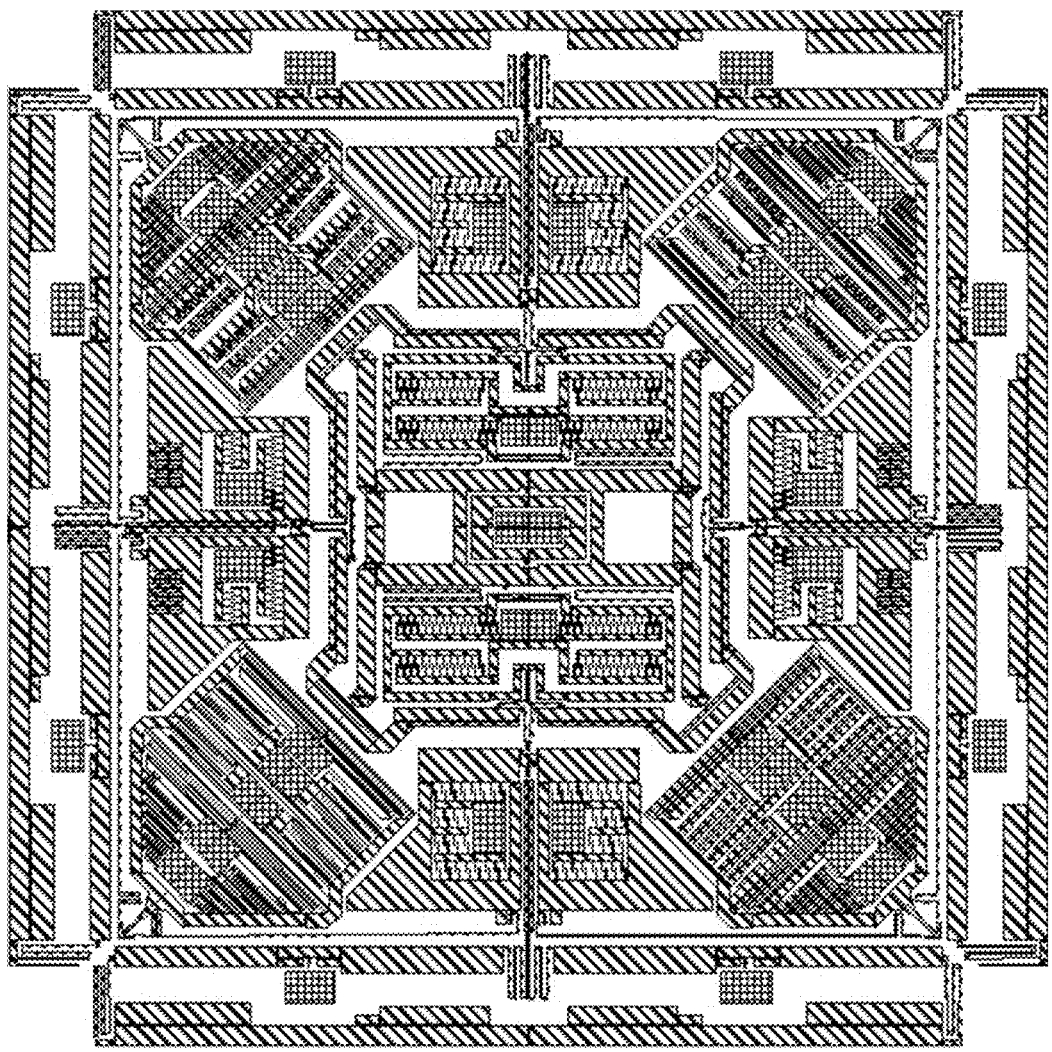

FIG. 9*c* illustrates how capacitive transducers may be implemented in the openings of the Coriolis masses, detection masses and the central suspension structure. These transducers may be used for generating the primary oscillation, detecting the secondary or the primary oscillation, or for other purposes. Transducers can be implemented in a similar manner in any practical example device presented in this disclosure.

Figure 10A:
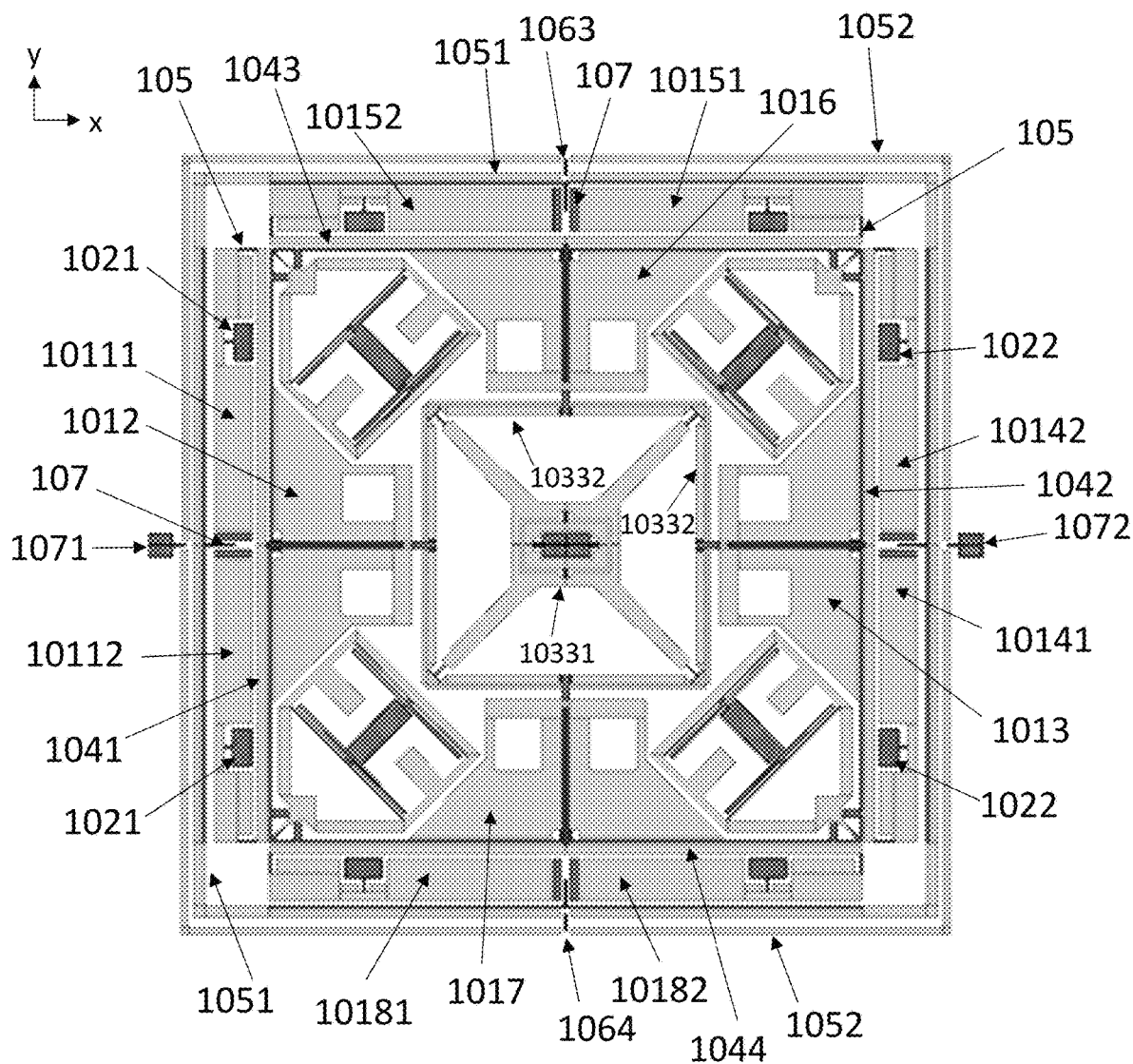
FIGS. 10a-10b illustrate a second practical example.

FIG. 10*a* illustrates a second example structure. This gyroscope is also suitable for measurement of angular rotation rate about the x-, y and z-axes. Reference numbers 1012-1013, 1016-1017 and 1021-1022 correspond to reference numbers 512-513, 516-517 and 521-522, respectively, in FIG. 5*a*. Reference numbers 10111 and 10112 together correspond to 511, 10141 and 10142 together correspond to 514, 10151 and 10152 together correspond to 515, and 10181 and 10182 together correspond to 518 in FIG. 5*a*. In other words, the peripheral suspension structure illustrated in FIG. 4*a* has been implemented in this structure, so that reference numbers 10111, 10112, 1041, 105 and 107 correspond to reference numbers 4111, 4112, 441, 45 and 47, respectively, in FIG. 4*a* and each of the other Coriolis pairs in the structure is suspended from a corresponding peripheral suspension structure.

Furthermore, a peripheral gimbal has been implemented in this structure, so that reference numbers 1051-1052, 1063-1064 and 1071-1072 correspond to reference numbers 551-552, 563-564 and 571-572, respectively, in FIG. 5*e*. This gyroscope could alternatively be implemented without the peripheral gimbal structure. Detection masses are present also in the structure shown in FIG. 10*a*. This example gyroscope can be driven in the first primary oscillation mode illustrated in FIG. 5*a*. The corresponding x-axis and y-axis secondary oscillation modes were illustrated in FIG. 5*b*, and the corresponding first z-axis secondary oscillation mode was illustrated in FIG. 6.

The connecting springs 105 and the inner bars 1041-1044 have enough in-plane flexibility to facilitate the primary oscillation movement which FIGS. 3*b* and 3*c* illustrate. In the y-axis secondary oscillation mode, the tilting of the first and second parts (10111+10112, 10141+10142, 10151+10152 and 10181+10182) of each outer Coriolis mass facilitates the simultaneous vertical motion described above where the first and third Coriolis masses move up when the second and fourth Coriolis masses move down, and vice versa. This motion is again synchronized by the central suspension structure.

Figure 10B:
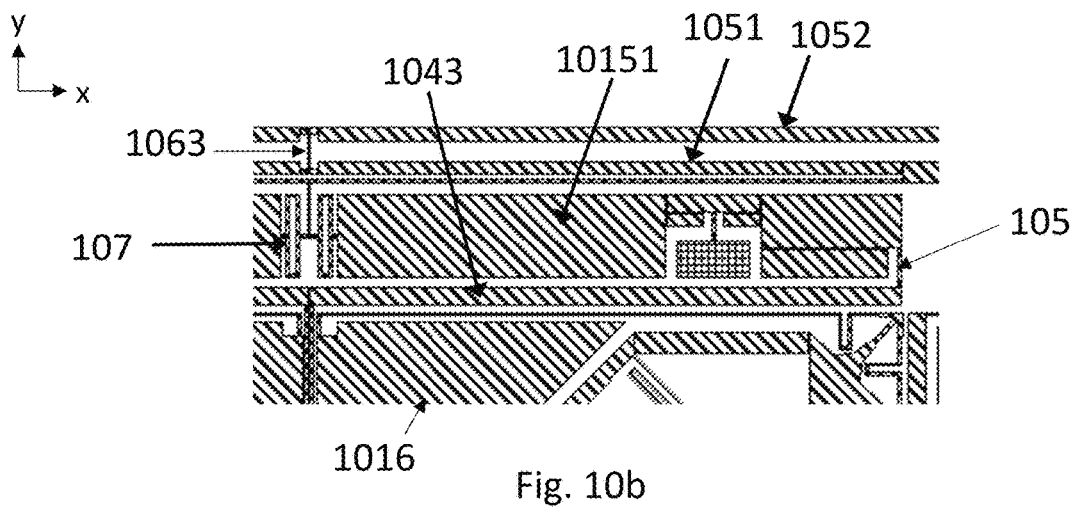

The central suspension structure here also comprises a central gimbal structure 10331 built around the first central anchor point. The central suspension structure also comprises a central synchronization structure which accommodates and synchronizes the movement of mass elements 1012, 1013, 1016 and 1017 in the primary oscillation mode and the y-axis and x-axis secondary oscillation modes. This central synchronization structure also comprises four corner elements 10332 which are connected to said mass elements and to each other with in-plane flexible springs which allow the corner elements to turn in relation to each other as the mass elements move in primary oscillation. The corner elements 10332 and the springs which join them together are stiff in the vertical direction to facilitate the synchronization of the x-axis and y-axis secondary oscillation modes through the central gimbal structure FIG. 10*b* illustrates the connection spring 105 and the connecting spring 107 in more detail. In the illustrated case the connecting spring 105 is simply a straight spring which extends in the direction of the y-axis and transfers movement vertical movement and movement along the y-axis from the sixth Coriolis mass 1016 and the inner bar 1043 to the first part of the fifth Coriolis mass 10151. The connecting spring has enough in-plane flexibility and torsional flexibility to facilitate the turning of the seesaw 10151 both in the device plane (as illustrated in FIGS. 4*b* and 4*c*) and out of the device plane. The inner bar 1043 may transfer both vertical and in-plane movement in a rigid manner.

The connecting spring 107 should facilitate the turning of the two parts 10151 and 10152 in relation to each other both within the device plane (in primary oscillation) and outside of the device plane (in the secondary oscillation mode, as described with reference to FIGS. 4a-4c above). The illustrated connecting spring 107 comprises two rectangular side parts which together facilitate both of these movements. Many other geometries which facilitate the specified movements are also possible in the connection springs 105 and the connecting spring 107. These considerations apply to all embodiments where the peripheral suspension structure shown in FIGS. 10a-10b is used.

Figure 10C:
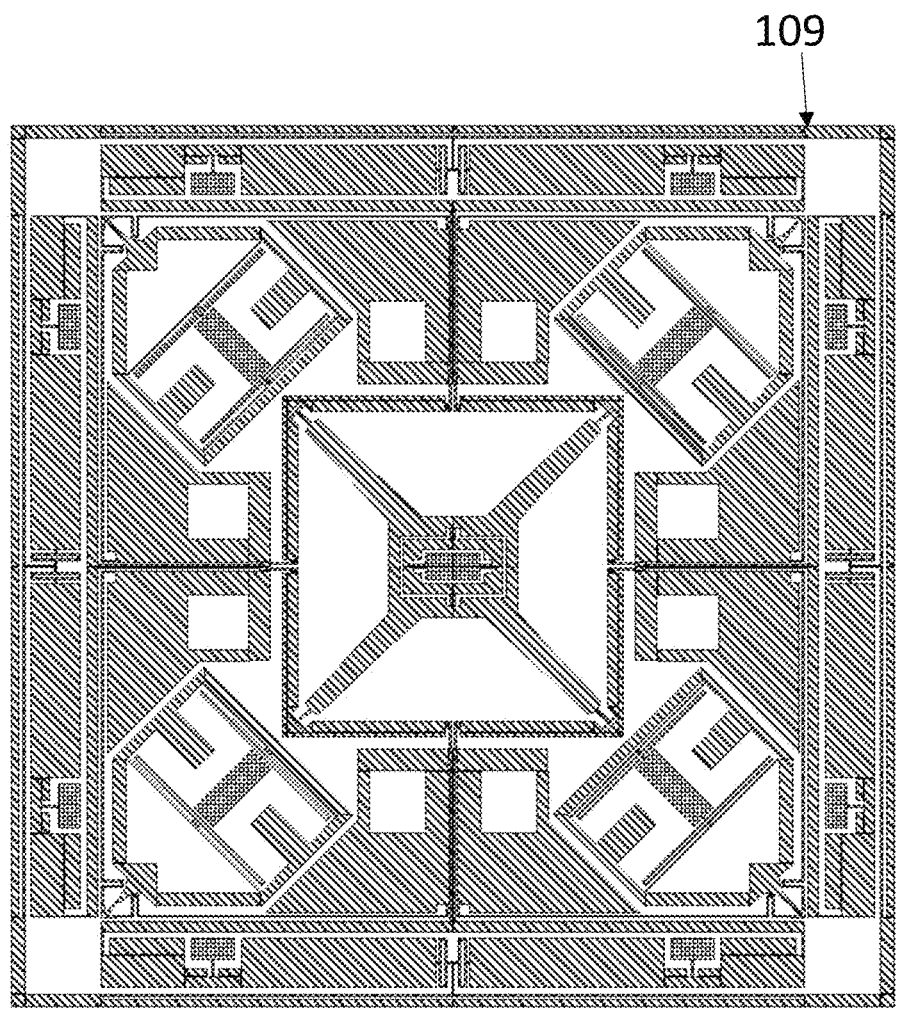
FIG. 10c illustrates an example structure with a frame.

FIG. 10c illustrates the second example structure with a simple frame 109 around outer Coriolis masses. This corresponds to the structure shown in FIG. 5f and reference number 109 corresponds to 55 in that figure.

Figure 11A:
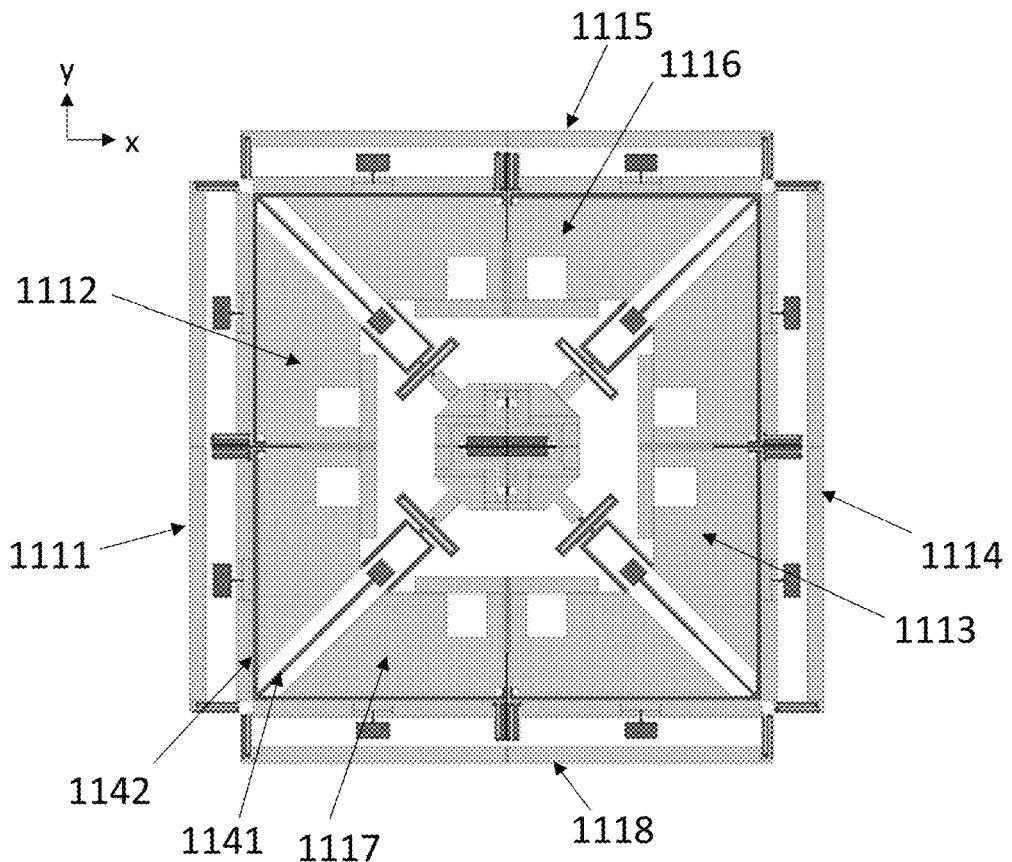
FIGS. 11a-11b illustrate a third practical example.

FIG. 11a illustrates a third example structure. This gyroscope is also suitable for measurement of angular rotation rate about the x-, y and z-axes. Reference numbers 1111-1118 correspond to reference numbers 511-518, respectively, in FIG. 5c. This example gyroscope can be driven in the second primary oscillation mode illustrated in FIG. 5c. The corresponding x-axis and y-axis secondary oscillation modes were illustrated in FIG. 5d and the corresponding second z-axis secondary oscillation mode was illustrated in FIG. 7. The peripheral suspension structures implemented in this gyroscope are the same as in FIG. 9a, so they will not be described further.

Figure 11B:
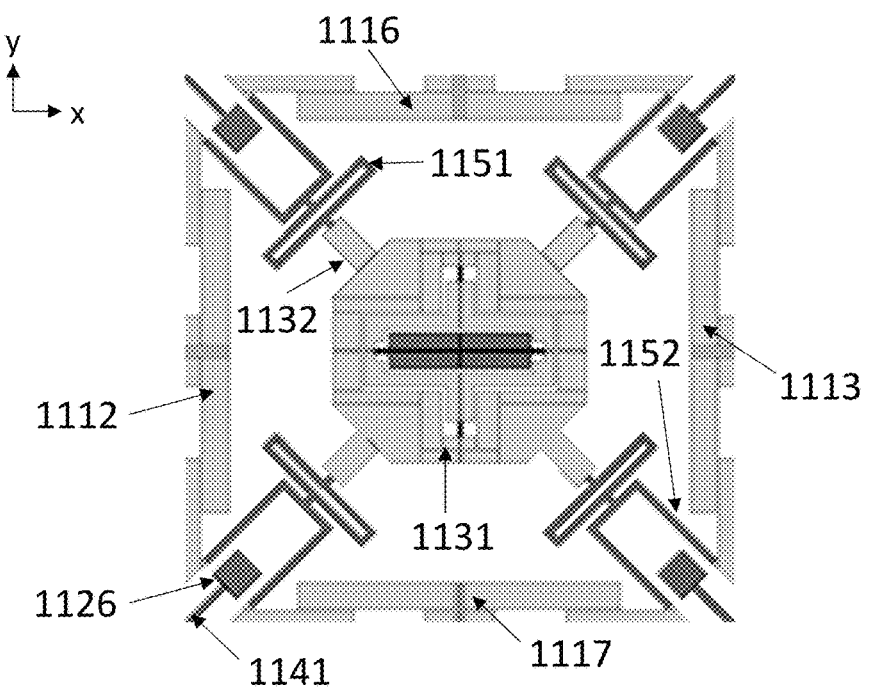

FIG. 11b illustrates in more detail the central suspension structure employed in FIG. 11a. It includes a central gimbal structure 1131 to facilitate rotation of the central suspension structure in the x-axis and y-axis secondary oscillation modes illustrated above. The central suspension structure also comprises a central synchronization structure. All parts of the central synchronization structure are rigid in the vertical direction so that x-axis and y-axis secondary oscillation modes are effectively synchronized via the central gimbal.

The central suspension structure comprises four rigid supports 1132 which extend outward from the central gimbal structure in the diagonal directions—that is, the directions defined by diagonal axes 693 and 694 in FIG. 6. Each rigid support is connected to a radially flexible but tangentially stiff first synchronization spring 1151 which flexibly accommodates the simultaneous outward and inward movement of Coriolis masses 1112-1113 and 1116-1117 in the primary oscillation mode. Two tangentially flexible but radially stiff second synchronization springs 1152 extend from the first synchronization spring 1151 to each of the adjacent Coriolis masses. For example, the two ends of the first synchronization spring 1151 are connected with second synchronization springs to Coriolis masses 1112 and 1116, respectively. The second synchronization springs flexibly accommodate the simultaneous tangential movement of Coriolis masses 1112-1113 and 1116-1117 in the second z-axis secondary oscillation mode.

The Coriolis masses 1112-1113 and 1116-1117 are in FIGS. 11a-11b supported by an additional intermediate suspension structure. Four diagonal anchor points 1126 are placed symmetrically in relation to the first center point on the first and second diagonal axes. Radial suspenders 1141 extend outward from each of these diagonal anchor points 1126. These radial suspenders are joined to a suspender frame 1142 which surrounds the Coriolis masses 1112-1113 and 1116-1117. The radial suspenders are stiff in the radial direction but flexible in the tangential direction, so they flexibly accommodate the simultaneous tangential movement of Coriolis masses 1112-1113 and 1116-1117 in the second z-axis secondary oscillation mode. The suspender frame rotates about the first center point in the second z-axis secondary oscillation mode and synchronizes the tangential mode of Coriolis masses. The central suspension structure illustrated in FIGS. 11a and 11b could be implemented also in the gyroscopes illustrated in FIGS. 9a and 10a.

More generally, in any embodiment where the second primary oscillation mode shown in FIG. 5c or 8b is used, the central suspension structure may comprise, around each center point, a suspension arrangement which is coupled to each corresponding inner Coriolis mass and allows them to move simultaneously in radial directions toward and away from the center point. The gyroscope may comprise additional suspension structures which couple the inner Coriolis masses together for tangential movement in the z-axis secondary oscillation mode.

FIG. 12 illustrates a fourth example structure. Reference numbers 1291-1293 correspond to reference numbers 891-893 in FIGS. 8a and 8b. As in the previous examples, this gyroscope is also suitable for measurement of angular rotation rate about the x-, y and z-axes. Reference numbers 1211-1214 and 1221-1228 correspond to reference numbers 811-814 and 821-828, respectively, in FIGS. 8a and 8b. The central suspension structure corresponds to the one illustrated in FIG. 9a, and the gyroscope shown in FIG. 12 may consequently be driven in the first primary oscillation mode illustrated in FIG. 8a (but this arrangement does not facilitate driving in the second primary oscillation mode). However, the central suspension structures illustrated in FIG. 12 could be replaced with the one shown in FIGS. 11a and 11b, and this would facilitate driving in the second primary oscillation mode which is illustrated in FIG. 8b (this arrangement would in turn not facilitate driving in the first primary oscillation mode). All other structures illustrated in FIG. 12 can be used with either of these two central suspension structures.

In FIG. 12, reference numbers 1241-1248 illustrate the first to eighth sets of peripheral anchor points, while reference number 127 shows detection masses which can be used to measure the z-axis secondary oscillation mode in the manner which was discussed above with reference to FIG. 6. Four detection masses may be coupled to the first and second Coriolis pairs and four to the third and fourth Coriolis mass pairs, as illustrated in FIG. 12.

FIG. 12 further illustrates first and second seesaw anchor points 1251 and 1252 which lie on a transversal y3-axis 1294 on opposite sides of the x-axis 1291. The y-axis 1294 lies substantially halfway between the y1-axis 1292 and the y2-axis 1293. A first lateral periphery seesaw 1261 is connected substantially at its midpoint to the first seesaw anchor point 1251 with a torsion bar which allows the first lateral periphery seesaw 1261 to rotate about the y3-axis 1294. The ends of the first lateral periphery seesaw 1261 are connected to the fifth Coriolis mass 1215 and the thirteenth Coriolis mass 1225.

A second lateral periphery seesaw 1262 is connected substantially at its midpoint to the second seesaw anchor point 1252 with a torsion bar which allows the second lateral periphery seesaw 1262 to rotate about the y3-axis 1294. The ends of the second lateral periphery seesaw 1262 are connected to the eighth Coriolis mass 1218 and the sixteenth Coriolis mass 1228.

In the x-axis secondary oscillation mode, the fifth Coriolis mass 1215 and the thirteenth Coriolis mass 1225 move in opposite vertical directions (regardless of which primary oscillation mode is being driven). The eighth and sixteenth Coriolis mass also move in opposite vertical directions. The first lateral periphery seesaw 1261 can thereby synchronize the oscillation of the third and seventh Coriolis pairs, and the second lateral periphery seesaw 1262 can synchronize the oscillation of the fourth and eighth Coriolis pairs in this secondary oscillation mode. The central suspension structures may also act as coupling and synchronizing elements between the third and the fourth Coriolis pairs and between the seventh and the eighth Coriolis pairs in this oscillation mode.

The first and second lateral periphery seesaws 1261 and 1262 may be stiff in the vertical direction, but they may have enough in-plane flexibility to flexibly accommodate the movement of mass elements 1215, 1225, 1218 and 1228 in the primary oscillation mode.

The invention claimed is:

1. A microelectromechanical gyroscope comprising a first set of Coriolis masses which in their rest position lie in a horizontal xy-plane defined by a lateral x-axis and a transversal y1-axis, wherein the x-axis crosses the y1-axis orthogonally at a first center point, and a vertical z-axis crosses both the x-axis and the y1-axis orthogonally at the first center point, and the first set of Coriolis masses comprises a first and a second Coriolis mass which together form a first Coriolis pair which in its rest position is aligned on the x-axis on a first side of the y1-axis, wherein the second Coriolis mass is closer to the y1-axis than the first, and the first set of Coriolis masses comprises a third and a fourth Coriolis mass which together form a second Coriolis pair which in its rest position is aligned on the x-axis on a second side of the y1-axis, wherein the third Coriolis mass is closer to the y1-axis than the fourth, and the second side of the y1-axis is opposite to the first, and the gyroscope also comprises a set of first peripheral anchor points on the first side of the y1-axis and a first peripheral suspension arrangement which suspends the first Coriolis pair from the set of first peripheral anchor points, and the gyroscope also comprises a set of second peripheral anchor points on the second side of the y1-axis and a second peripheral suspension arrangement which suspends the second Coriolis pair from the set of second peripheral anchor points, and the gyroscope further comprises a first central suspension arrangement which suspends both the first and the second Coriolis pairs from one or more first central anchor points located substantially at the first center point, wherein the gyroscope further comprises one or more drive transducers which set the first and second Coriolis pairs into motion in a primary oscillation mode, and one or more y-axis sense transducers for detecting the oscillation of the first and second Coriolis pairs in a y-axis secondary oscillation mode induced by the Coriolis force when the gyroscope undergoes angular rotation about an axis which is parallel to the y1-axis, wherein the first central suspension arrangement and the first and second peripheral suspension arrangements flexibly accommodate the primary oscillation mode and the y-axis secondary oscillation mode, wherein in the primary oscillation mode, the first set of Coriolis masses is configured to oscillate so that the second and third Coriolis masses move in linear translation along the x-axis away from the first center point when the first and fourth Coriolis masses move in linear translation along the x-axis towards the first center point, and vice versa, and wherein, in the y-axis secondary oscillation mode, the first set of Coriolis masses is configured to oscillate so that the first, second, third and fourth Coriolis masses undergo vertical motion wherein the first and third Coriolis masses move up when the second and fourth Coriolis masses move down, and vice versa, and the set of first peripheral anchor points comprises two first peripheral anchor points placed on opposite sides of the x-axis at a substantially equal distance from the x-axis, and the first peripheral suspension arrangement comprises two first transversal seesaws, wherein the proximal end of each first transversal seesaw, which is the end closer to the x-axis, is connected to the second Coriolis mass, and the distal end of each first transversal seesaw, which is further away from the x-axis than its proximal end, is connected to the first Coriolis mass, and the set of second peripheral anchor points comprises two second peripheral anchor points placed on opposite sides of the x-axis at a substantially equal distance from the x-axis, and the second peripheral suspension arrangement comprises two second transversal seesaws, wherein the proximal end of each second transversal seesaw, which is the end closer to the x-axis, is connected to the third Coriolis mass, and the distal end of each second transversal seesaw, which is further away from the x-axis than its proximal end, is connected to the fourth Coriolis mass, wherein each transversal seesaw is connected to the corresponding peripheral anchor point with an anchoring spring which allows the seesaw to turn in the xy-plane and to rotate about a lateral rotation axis that extends in a direction of the x-axis in the y-axis secondary oscillation mode, so that the first and second peripheral suspension arrangements synchronize the movement of the first set of Coriolis masses in the primary oscillation mode and in the y-axis secondary oscillation mode.

2. The microelectromechanical gyroscope according to claim 1, wherein the moments of inertia of the first, second, third and fourth Coriolis masses with respect to the y1-axis are all equal.

3. The microelectromechanical gyroscope according to claim 1, wherein the gyroscope further comprises a second set of Coriolis masses, and the second set comprises a fifth and a sixth Coriolis mass which together form a third Coriolis pair which in its rest position is aligned on the y1-axis on a first side of the x-axis, wherein the sixth Coriolis mass is closer to the x-axis than the fifth, and the second set of Coriolis masses further comprises a seventh and an eighth Coriolis mass which together form a fourth Coriolis pair which in its rest position is aligned on the y1-axis on a second side of the x-axis, wherein the seventh Coriolis mass is closer to the x-axis than the eighth, and the second side of the x-axis is opposite to the first, and the gyroscope also comprises a set of third peripheral anchor points on the first side of the x-axis and a third peripheral suspension arrangement which suspends the third Coriolis pair from the set of third peripheral anchor points, and the gyroscope also comprises a set of fourth peripheral anchor points on the second side of the x-axis and a fourth peripheral suspension arrangement which suspends the fourth Coriolis pair from the set of fourth peripheral anchor points, and the first central suspension arrangement suspends both the third and the fourth Coriolis pairs from the first central anchor point, and the one or more drive transducers also set the third and fourth Coriolis pairs into motion in the primary oscillation mode, and the gyroscope comprises one or more x-axis sense transducers for detecting the oscillation of the third and fourth Coriolis pairs in an x-axis secondary oscillation mode induced by the Coriolis force when the gyroscope undergoes angular rotation about the x-axis, wherein the first central suspension arrangement and the third and fourth peripheral suspension arrangements flexibly accommodate the primary oscillation mode and the x-axis secondary oscillation mode, wherein in the primary oscillation mode, the second set of Coriolis masses is configured to oscillate so that the sixth and seventh Coriolis masses move in linear translation along the y1-axis away from the first center point when the fifth and eighth Coriolis masses move in linear translation along the y1-axis towards the first center point, and vice versa, and wherein in the primary oscillation mode the fifth Coriolis mass either moves away from the first center point when the first Coriolis mass moves towards the first center point, and vice versa, or the fifth Coriolis mass and the first Coriolis mass move away from and towards the first center point at the same time, and wherein, in the x-axis secondary oscillation mode the second set of Coriolis masses is configured to oscillate so that the fifth, sixth, seventh and eighth Coriolis masses undergo simultaneous vertical translation wherein the fifth and seventh Coriolis masses move up when the sixth and eighth Coriolis masses move down, and vice versa.

4. The microelectromechanical gyroscope according to claim 3, wherein the following sums are equal:
the moment of inertia of the second Coriolis mass with respect to the y1-axis plus the moment of inertia of the third Coriolis mass with respect to the y1-axis,
the moment of inertia of the first Coriolis mass with respect to the y1-axis plus the moment of inertia of the fourth Coriolis mass with respect to the y1-axis,
the moment of inertia of the sixth Coriolis mass with respect to the x-axis plus the moment of inertia of the seventh Coriolis mass with respect to the x-axis,
the moment of inertia of the fifth Coriolis mass with respect to the x-axis plus the moment of inertia of the eighth Coriolis mass with respect to the x-axis.

5. The microelectromechanical gyroscope according to claim 4, wherein the moments of inertia of the first, second, third and fourth Coriolis masses with respect to the y1-axis and the moments of inertia of the fifth, sixth, seventh and eighth Coriolis masses with respect to the x-axis are all equal.

6. The microelectromechanical gyroscope according to claim 3, wherein the gyroscope comprises a peripheral gimbal structure which surrounds the first and second sets of Coriolis masses, wherein the peripheral gimbal structure comprises an inner gimbal frame and an outer gimbal frame, and the outer gimbal frame is suspended with two gimbal torsion bars from two gimbal anchor points aligned on opposite sides of the first set of Coriolis masses on a first gimbal axis, which is the x-axis, and the inner gimbal frame is suspended from the outer gimbal frame by two additional gimbal torsion bars aligned on opposite sides of the second set of Coriolis masses on a second gimbal axis, which is the y1-axis, and the inner gimbal frame is attached to the Coriolis pair aligned on the first gimbal axis and to the Coriolis pairs aligned on the second gimbal axis.

7. The microelectromechanical gyroscope according to claim 3, wherein the gyroscope further comprises a third set of Coriolis masses which comprises a ninth and a tenth Coriolis mass which together form a fifth Coriolis pair which in its rest position is aligned on the x-axis on a first side of a transversal y2-axis and the tenth Coriolis mass is closer to the y2-axis than the ninth, wherein the x-axis crosses the y2-axis orthogonally at a second center point, and the third set of Coriolis masses further comprises an eleventh and a twelfth Coriolis mass which together form a sixth Coriolis pair which in its rest position is aligned on the x-axis on a second side of the y2-axis, wherein the eleventh Coriolis mass is closer to the y2-axis than the twelfth, and the second side of the y2-axis is opposite to the first, and the gyroscope further comprises a fourth set of Coriolis masses which comprises a thirteenth and a fourteenth Coriolis mass which together form a seventh Coriolis pair which in its rest position is aligned on the y2-axis on a first side of the x-axis, and the fourteenth Coriolis mass is closer to the x-axis than the thirteenth, and the fourth set of Coriolis masses further comprises a fifteenth and a sixteenth Coriolis mass which together form an eighth Coriolis pair which in its rest position is aligned on the y2-axis on a second side of the x-axis, wherein the fifteenth Coriolis mass is closer to the y2-axis than the sixteenth, and the gyroscope also comprises a set of fifth peripheral anchor points on the first side of the y2-axis and a fifth peripheral suspension arrangement which suspends the fifth Coriolis pair from the set of fifth peripheral anchor points, and a set of sixth peripheral anchor points on the second side of the y2-axis and a sixth peripheral suspension arrangement which suspends the sixth Coriolis pair from the set of sixth peripheral anchor points, and a set of seventh peripheral anchor points on the first side of the x-axis and a seventh peripheral suspension arrangement which suspends the seventh Coriolis pair from the set of seventh peripheral anchor points, and a set of eighth peripheral anchor points on the second side of the x-axis and an eighth peripheral suspension arrangement which suspends the eighth Coriolis pair from the set of eighth peripheral anchor points, and the gyroscope further comprises a second central suspension arrangement which suspends the fifth, sixth, seventh and eighth Coriolis pairs from one or more central anchor points located substantially at the second center point, wherein the second central suspension arrangement and the fifth, sixth, seventh and eighth peripheral suspension arrangements flexibly accommodate the primary oscillation mode and the x-axis and y-axis secondary oscillation modes, wherein in the primary oscillation mode the third set of Coriolis masses is configured to oscillate so that the tenth and eleventh Coriolis masses move in linear translation along the x-axis away from the second center point when the ninth and twelfth Coriolis masses move in linear translation along the x-axis towards the second center point, and vice versa, and in the primary oscillation mode the fourth set Coriolis masses is configured to oscillate so that the fourteenth and fifteenth Coriolis masses move in linear translation along the y2-axis away from the second center point when the thirteenth and sixteenth Coriolis masses move in linear translation along the y2-axis towards the second center point, and vice versa, and in the y-axis secondary oscillation mode the third set of Coriolis masses is configured to oscillate so that the ninth, tenth, eleventh and twelfth Coriolis masses undergo vertical motion wherein the ninth and eleventh Coriolis masses move up when the tenth and twelfth Coriolis masses move down, and vice versa, and in the x-axis secondary oscillation mode the fourth set of Coriolis masses is configured to oscillate so that the thirteenth, fourteenth, fifteenth and sixteenth Coriolis masses undergo vertical motion wherein the fourteenth and fifteenth Coriolis masses move up when the thirteenth and sixteenth Coriolis masses move down, and vice versa, and wherein in the primary oscillation mode the ninth Coriolis mass always moves away from the second center point when the fourth Coriolis mass moves towards the first center point, and vice versa, and the thirteenth Coriolis mass either moves away from the first center point when the ninth Coriolis mass moves towards the second center point, and vice versa, or the thirteenth Coriolis mass and the ninth Coriolis mass move away from and towards the second center point at the same time.

8. The microelectromechanical gyroscope according to claim 7, wherein the following sums are substantially equal:
the moment of inertia of the second Coriolis mass with respect to the y1-axis plus the moment of inertia of the third Coriolis mass with respect to the y1-axis,
the moment of inertia of the first Coriolis mass with respect to the y1-axis plus the moment of inertia of the fourth Coriolis mass with respect to the y1-axis,
the moment of inertia of the sixth Coriolis mass with respect to the x-axis plus the moment of inertia of the seventh Coriolis mass with respect to the x-axis,
the moment of inertia of the fifth Coriolis mass with respect to the x-axis plus the moment of inertia of the eighth Coriolis mass with respect to the x-axis,
the moment of inertia of the tenth Coriolis mass with respect to the y2-axis plus the moment of inertia of the eleventh Coriolis mass with respect to the y2-axis,
the moment of inertia of the ninth Coriolis mass with respect to the y2-axis plus the moment of inertia of the twelfth Coriolis mass with respect to the y2-axis,
the moment of inertia of the fourteenth Coriolis mass with respect to the x-axis plus the moment of inertia of the fifteenth Coriolis mass with respect to the x-axis,
the moment of inertia of the thirteenth Coriolis mass with respect to the x-axis plus the moment of inertia of the sixteenth Coriolis mass with respect to the x-axis.

9. The microelectromechanical gyroscope according to claim 8, wherein the moments of inertia of the first, second, third and fourth Coriolis masses with respect to the y1-axis, the moments of inertia of the fifth, sixth, seventh and eighth Coriolis masses with respect to the x-axis, the moments of inertia of the ninth, tenth, eleventh and twelfth Coriolis masses with respect to the y2-axis and the moments of inertia of the thirteenth, fourteenth, fifteenth and sixteenth Coriolis masses with respect to the x-axis are all substantially equal.

10. The microelectromechanical gyroscope according to claim 1, wherein the moment of inertia of the second Coriolis mass with respect to the y1-axis plus the moment of inertia of the third Coriolis mass with respect to the y1-axis is equal to the moment of inertia of the first Coriolis mass with respect to the y1-axis plus the moment of inertia of the fourth Coriolis mass with respect to the y1-axis.

* * * * *